United States Patent
Araki

(10) Patent No.: US 9,794,445 B2
(45) Date of Patent: Oct. 17, 2017

(54) IMAGE FORMING APPARATUS

(71) Applicant: CANON KABUSHIKI KAISHA, Tokyo (JP)

(72) Inventor: Ryuichi Araki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/210,394

(22) Filed: Jul. 14, 2016

(65) Prior Publication Data

US 2017/0019563 A1    Jan. 19, 2017

(30) Foreign Application Priority Data

Jul. 16, 2015 (JP) ................... 2015-141778

(51) Int. Cl.
| | |
|---|---|
| *H04N 1/405* | (2006.01) |
| *H04N 1/06* | (2006.01) |
| *H04N 1/047* | (2006.01) |
| *H04N 1/113* | (2006.01) |
| *G03G 15/04* | (2006.01) |

(52) U.S. Cl.
CPC .......... *H04N 1/4052* (2013.01); *G03G 15/04* (2013.01); *H04N 1/047* (2013.01); *H04N 1/06* (2013.01); *H04N 1/113* (2013.01); *H04N 2201/0094* (2013.01)

(58) Field of Classification Search
CPC ...... G03G 15/04; H04N 1/4052; H04N 1/047; H04N 1/06; H04N 1/113; H04N 2201/0094; H04N 1/40093
See application file for complete search history.

(56) References Cited

U.S. PATENT DOCUMENTS

| | | | |
|---|---|---|---|
| 8,837,011 B2 | 9/2014 | Takikawa et al. | H04N 1/40093 |
| 8,917,305 B2 | 12/2014 | Nakahata et al. | G03G 15/0415 |

(Continued)

FOREIGN PATENT DOCUMENTS

JP    2012-098622    5/2012

OTHER PUBLICATIONS

U.S. Appl. No. 15/210,365, filed Jul. 14, 2016.

(Continued)

*Primary Examiner* — Christopher D Wait
(74) *Attorney, Agent, or Firm* — Fitzpatrick, Cella, Harper & Scinto

(57) ABSTRACT

An image forming apparatus includes: a photosensitive member rotating in a first direction; a light scanning device, when the photosensitive member rotates at a slower speed, irradiate the photosensitive member with light beam through use of part of scanning lines corresponding to the slower speed; a storage unit in which information on positional deviation of the scanning lines in the first direction is stored; and a correction portion calculating a correction value for correcting positional deviation amounts of a predetermined scanning line and a scanning line group, which is included within a predetermined range in an advance direction and a return direction in the first direction from the predetermined scanning line, with extracting information corresponding to the part of the scanning lines from the stored information when the photosensitive member rotates at the slower speed, and correcting positional deviation of the predetermined scanning line based on the calculated correction value.

11 Claims, 23 Drawing Sheets

(56) References Cited

U.S. PATENT DOCUMENTS

| | | | |
|---|---|---|---|
| 9,261,809 B2 | 2/2016 | Furuta | G03G 15/04072 |
| 2016/0147170 A1 | 5/2016 | Furuta | G03G 15/043 |

OTHER PUBLICATIONS

U.S. Appl. No. 15/210,380, filed Jul. 14, 2016.
U.S. Appl. No. 15/210,389, filed Jul. 14, 2016.
U.S. Appl. No. 15/210,402, filed Jul. 14, 2016.
U.S. Appl. No. 15/222,692, filed Jul. 28, 2016.
U.S. Appl. No. 15/222,687, filed Jul. 28, 2016.

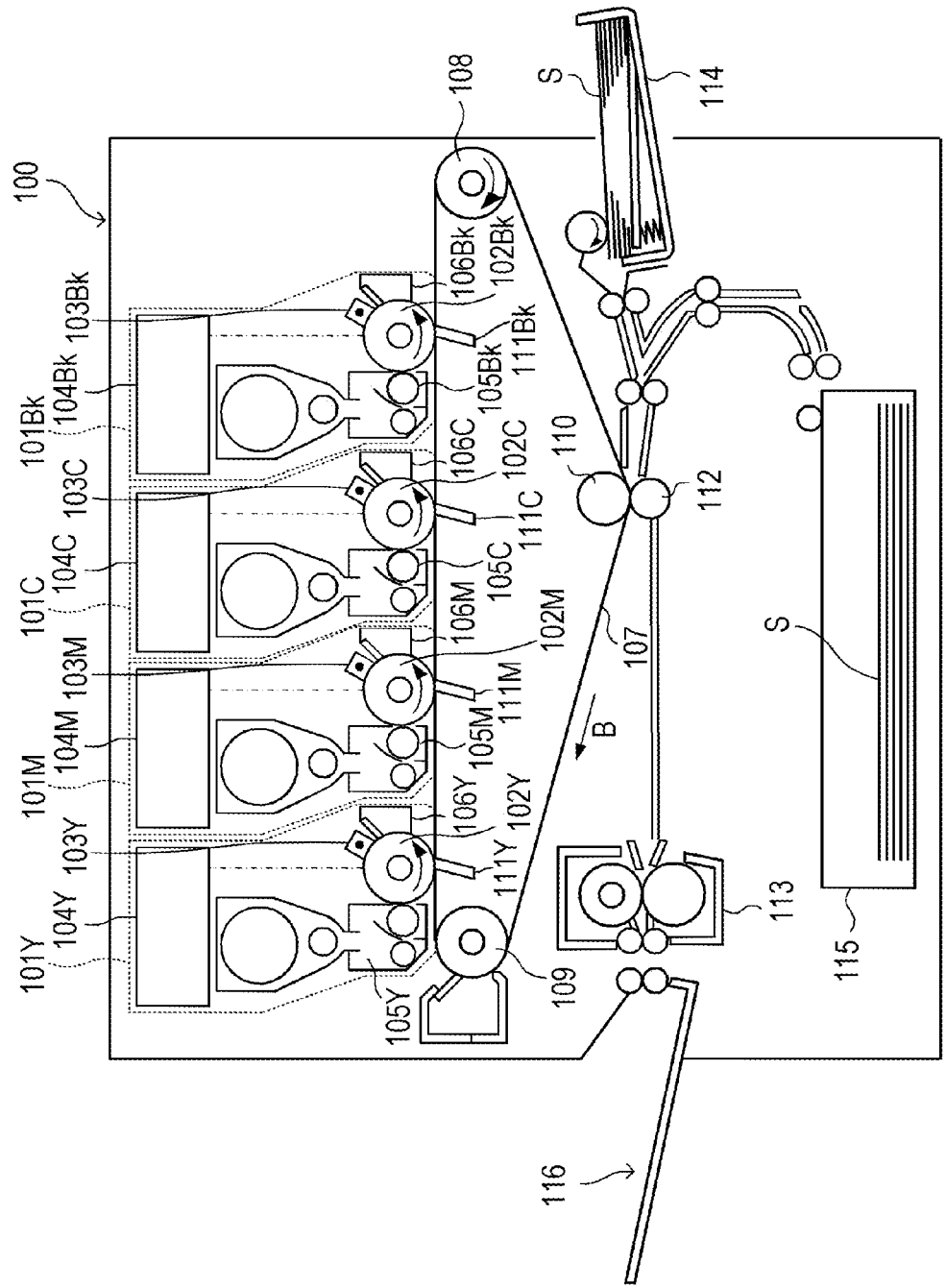

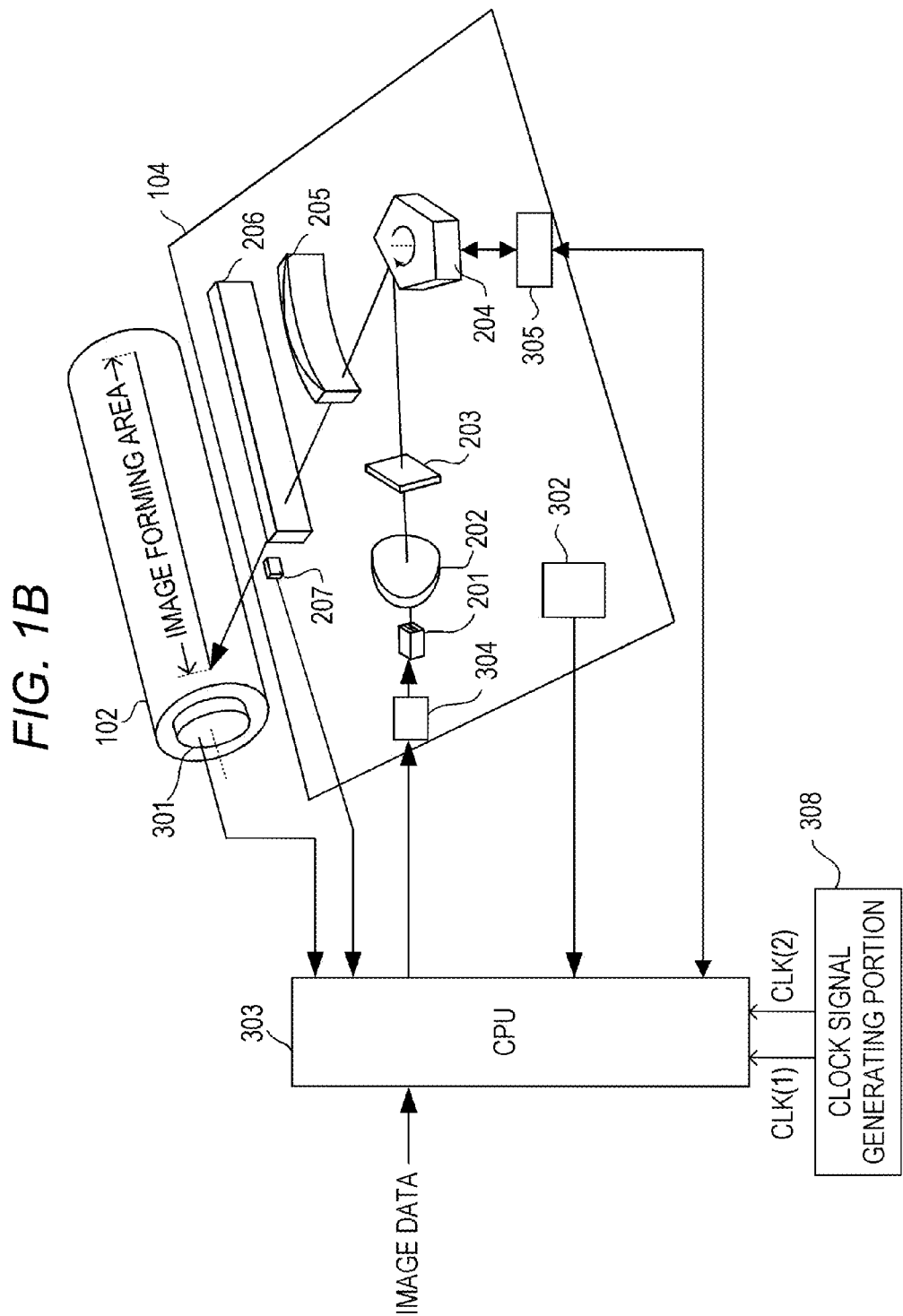

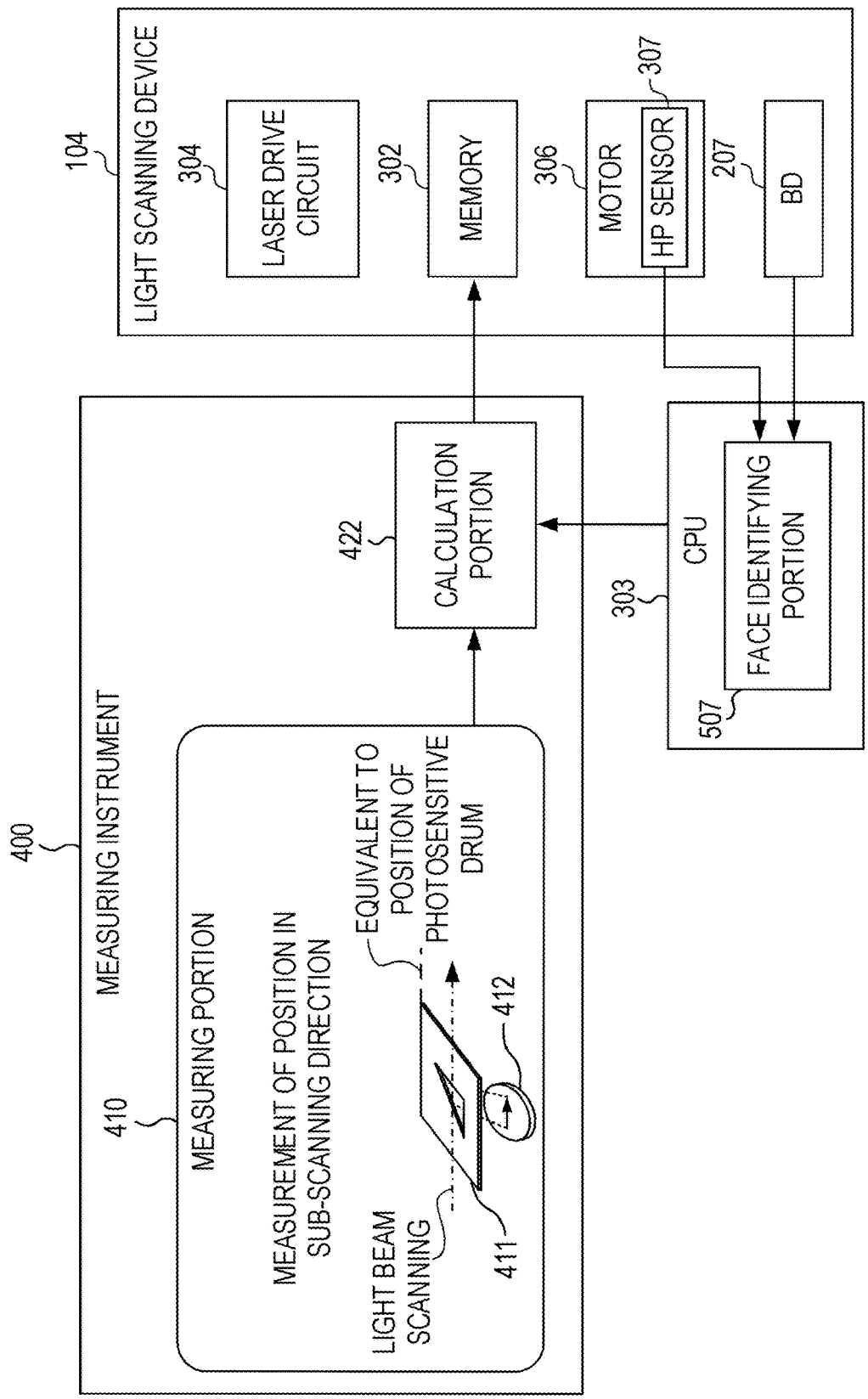

SCANNING POSITIONS ARE DENSE

SCANNING POSITIONS ARE SPARSE

SCANNING POSITIONS ARE SHIFTED IN ADVANCE DIRECTION

SCANNING POSITIONS ARE SHIFTED IN RETURN DIRECTION

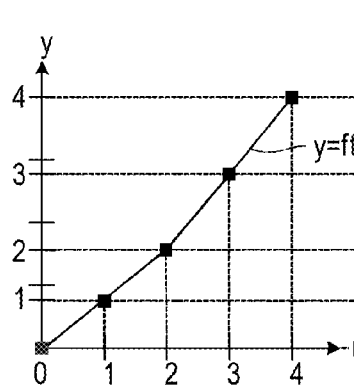
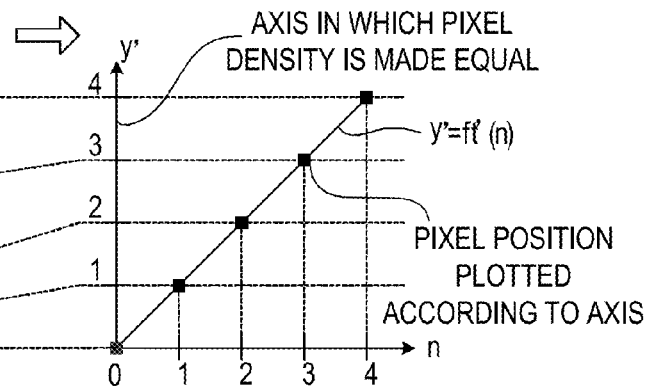
FIG. 12A    FIG. 12B
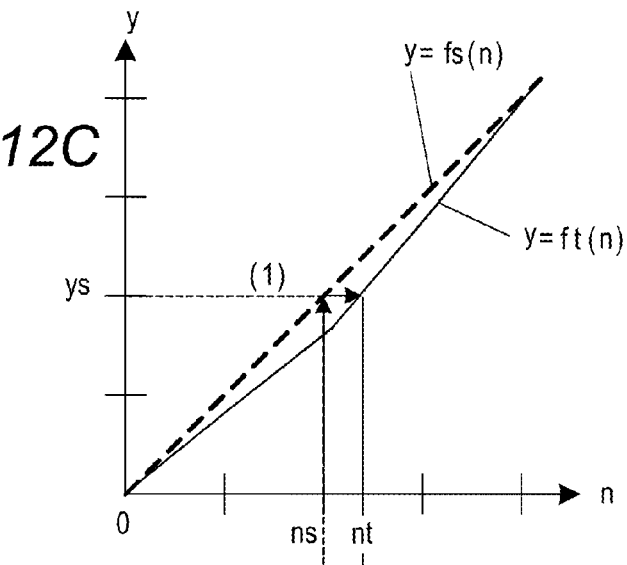
FIG. 12C
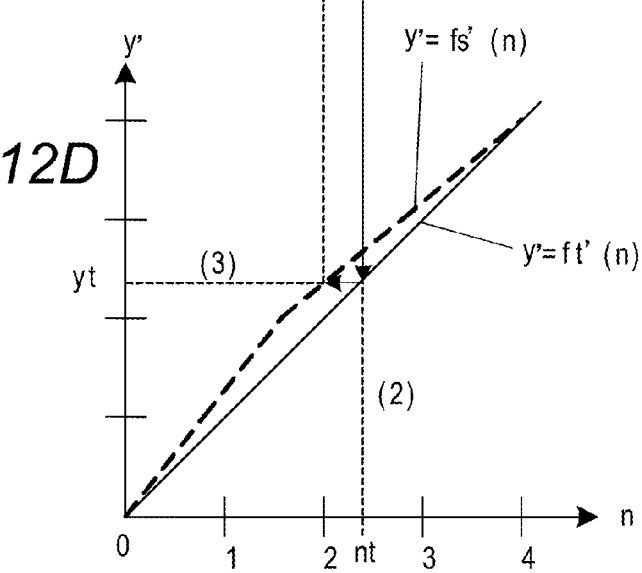
FIG. 12D

SCANNING POSITIONS ARE DENSE

SCANNING POSITIONS ARE SPARSE

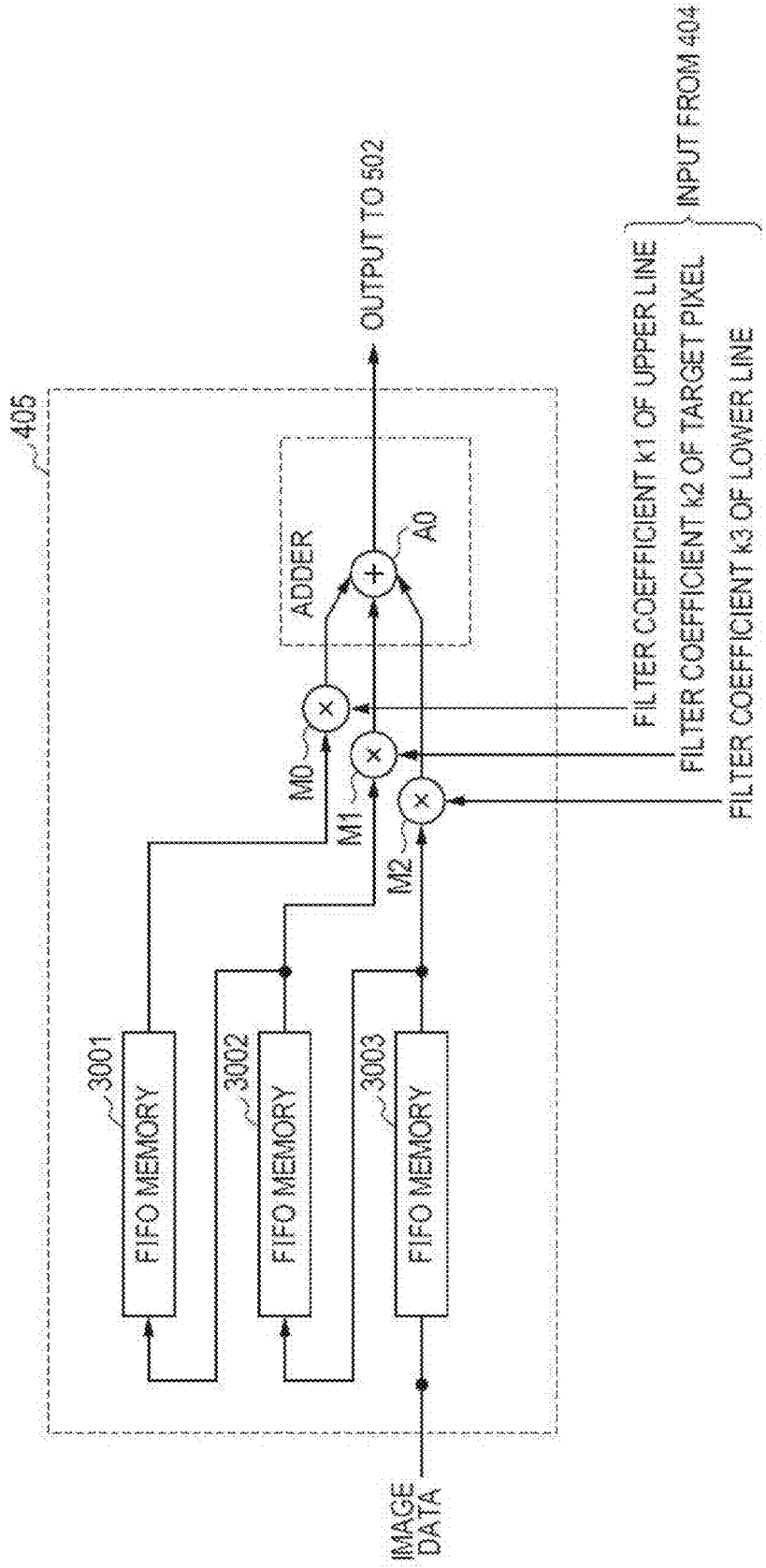

FIG. 19

|      | 0 | 1 | 2 | 3 | 4 | 5 | 6 | 7 | 8 | 9 | 10 | 11 | 12 | 13 | 14 | 15 |
|------|---|---|---|---|---|---|---|---|---|---|----|----|----|----|----|----|
| 0000 | 0 | 0 | 0 | 0 | 0 | 0 | 0 | 0 | 0 | 0 | 0  | 0  | 0  | 0  | 0  | 0  |
| 0001 | 0 | 0 | 0 | 0 | 0 | 0 | 0 | 0 | 0 | 0 | 0  | 0  | 0  | 0  | 1  | 1  |
| 0010 | 0 | 0 | 0 | 0 | 0 | 0 | 0 | 0 | 0 | 0 | 0  | 0  | 0  | 1  | 1  | 1  |
| 0011 | 0 | 0 | 0 | 0 | 0 | 0 | 0 | 0 | 0 | 0 | 0  | 0  | 1  | 1  | 1  | 1  |
| 0100 | 0 | 0 | 0 | 0 | 0 | 0 | 0 | 0 | 0 | 0 | 0  | 1  | 1  | 1  | 1  | 1  |
| 0101 | 0 | 0 | 0 | 0 | 0 | 0 | 0 | 0 | 0 | 0 | 1  | 1  | 1  | 1  | 1  | 1  |
| 0110 | 0 | 0 | 0 | 0 | 0 | 0 | 0 | 0 | 0 | 1 | 1  | 1  | 1  | 1  | 1  | 1  |
| 0111 | 0 | 0 | 0 | 0 | 0 | 0 | 0 | 0 | 1 | 1 | 1  | 1  | 1  | 1  | 1  | 1  |
| 1000 | 0 | 0 | 0 | 0 | 0 | 0 | 0 | 1 | 1 | 1 | 1  | 1  | 1  | 1  | 1  | 1  |
| 1001 | 0 | 0 | 0 | 0 | 0 | 0 | 1 | 1 | 1 | 1 | 1  | 1  | 1  | 1  | 1  | 1  |
| 1010 | 0 | 0 | 0 | 0 | 0 | 1 | 1 | 1 | 1 | 1 | 1  | 1  | 1  | 1  | 1  | 1  |
| 1011 | 0 | 0 | 0 | 0 | 1 | 1 | 1 | 1 | 1 | 1 | 1  | 1  | 1  | 1  | 1  | 1  |
| 1100 | 0 | 0 | 0 | 1 | 1 | 1 | 1 | 1 | 1 | 1 | 1  | 1  | 1  | 1  | 1  | 1  |
| 1101 | 0 | 0 | 1 | 1 | 1 | 1 | 1 | 1 | 1 | 1 | 1  | 1  | 1  | 1  | 1  | 1  |
| 1110 | 0 | 1 | 1 | 1 | 1 | 1 | 1 | 1 | 1 | 1 | 1  | 1  | 1  | 1  | 1  | 1  |
| 1111 | 1 | 1 | 1 | 1 | 1 | 1 | 1 | 1 | 1 | 1 | 1  | 1  | 1  | 1  | 1  | 1  |

IMAGE FORMING APPARATUS

BACKGROUND OF THE INVENTION

Field of the Invention

The present invention relates to an image forming apparatus (e.g. a digital copying machine, a multifunctional peripheral, or a laser printer) for performing a correction method for correcting distortion and uneven image density during image formation of a two-dimensional image.

Description of the Related Art

In electrophotographic image forming apparatus such as a laser printer and a copying machine, there has been generally known a configuration to form a latent image on a photosensitive member through use of a light scanning device configured to perform scanning with a laser beam. In the light scanning device of a laser scanning type, a laser beam collimated through use of a collimator lens is deflected by a rotary polygon mirror, and the deflected laser beam is formed into an image on a photosensitive member through use of an elongated fθ lens. There is known multibeam scanning in which a laser light source having a plurality of light emission points is included in one package so as to perform scanning with a plurality of laser beams simultaneously.

In order to form a satisfactory image without uneven image density and banding, it is desired that distances between scanning lines of a laser beam scanning positions adjacent in a rotational direction of the photosensitive member be equal to each other. However, the distances between the scanning lines are varied due to a plurality of factors described below. The distances between the scanning lines on the photosensitive member are varied by, for example, a fluctuation in a surface speed of the photosensitive member, or a rotation speed fluctuation of a rotary polygon mirror. Further, the distances between the scanning lines are also varied by a variation in angle of mirror faces of the rotary polygon mirror with respect to a rotary shaft of the rotary polygon mirror and a variation in intervals between light emission points arranged on a laser light source. FIG. 18A is an illustration of a state in which an interval between the scanning lines is varied periodically, with scanning of laser beams being represented by horizontal lines. As illustrated in FIG. 18A, when the interval between the scanning lines of laser beams is small, an image is developed darkly. When the interval between the scanning lines of laser beams is large, an image is developed lightly. Thus, this development is liable to be detected as moire and the like. To cope with uneven image density and banding caused by such factors, there has been proposed a technology of correcting banding by controlling an exposure amount of the light scanning device. For example, in Japanese Patent Application Laid-Open No. 2012-098622, there is described a configuration in which a beam position detection unit configured to detect a beam position in a sub-scanning direction is arranged in the vicinity of the photosensitive member, and the exposure amount of the light scanning device is adjusted based on scanning distance information obtained from a detected beam position, to thereby make banding less noticeable.

In the image forming apparatus, when a printing speed is changed in accordance with the type of a recording material, thinning control, e.g., face skipping control is performed in some cases. For example, in the face skipping control, light exposure is performed once for a plurality of times of scanning. Through the thinning control, the printing speed can be changed without performing control of changing the speed of a motor of a rotary polygon mirror.

In the related-art method of adjusting density based on the exposure amount, an optimum amount of controlling a light amount is varied depending on a change in image forming conditions of the image forming apparatus. Therefore, it is difficult to perform banding correction stably. As the changes in image forming conditions, there are given, for example, a change in ambient temperature environment of the image forming apparatus, a change in sensitivity to light of the photosensitive member, and a change in a relationship between density and a light amount due to a change with time of characteristics of a toner material.

In a color image forming apparatus, when positional deviation occurs at a relatively long period, positional deviation occurs between colors at a long period to cause an image defect, e.g., uneven color quality. FIG. 18B is an illustration of a state of positional deviation of each scanning line. When printing is performed at a resolution of 1,200 dpi (scanning line interval: 21.16 μm) with respect to an image formed on a sheet having an image width of 297 mm in an A4 longitudinal direction (hereinafter simply referred to as "image"), about 14,000 scanning lines are formed. Due to the factors, e.g., a fluctuation in surface speed of the photosensitive member, the positional deviation amount between an ideal position of the scanning line and an actual scanning position in an image area is varied in a non-uniform manner. In FIG. 18B, in the 2,000th line and 7,000th line from a leading edge of an image, the scanning position of a scanning line represented by the solid line is deviated in a front direction from an ideal position represented by the broken line, and in the 10,000th line, the scanning position is deviated in a direction opposite to the front direction. When the scanning line, that is, the image position is deviated from the ideal position in the image area, a problem, e.g., a color quality variation occurs, and hence a configuration to move the absolute position of image data is required.

At a time of the face skipping control, there is a problem in that banding cannot be suppressed appropriately with a related-art optical face tangle error (banding) correction. In the related-art optical face tangle error correction, correction data is obtained from upper and lower regions in the sub-scanning direction of a target pixel to be corrected. When the correction data is obtained from the upper and lower regions in the sub-scanning direction of the target pixel, there exists a face that is not used for the face skipping control. With this, there is a problem in that proper banding correction may not be performed uniformly.

It is an object of the present invention to reduce an image defect, e.g., banding and color misregistration, even when thinning control is performed.

SUMMARY OF THE INVENTION

In order to solve the above-mentioned problem, according to one embodiment of the present invention, there is provided an image forming apparatus, including: a photosensitive member rotating in a first direction; a light scanning device having: a light source including a plurality of light emission points; and a deflecting unit configured to deflect a light beam emitted from the light source and move spots of the light beam radiated to the photosensitive member in a second direction orthogonal to the first direction, to thereby form scanning lines, the light scanning device configured to, when the photosensitive member rotates at a slower speed than a predetermined speed, irradiate the photosensitive member with the light beam through use of part of scanning lines corresponding to the slower speed among a plurality of scanning lines formed on the photosensitive member when the photosensitive member rotates at the predetermined speed; a storage unit in which information on positional deviation of the plurality of scanning lines in the first direction is stored; and a correction portion configured to, with a predetermined scanning line and a scanning line group included within a predetermined range in an advance direction and a return direction in the first direction from the predetermined scanning line being targeted, calculate a correction value for correcting positional deviation amounts of the predetermined scanning line and the scanning line group in the first direction based on the information stored in the storage unit, and correct positional deviation of the predetermined scanning line in the first direction based on the calculated correction value, wherein the correction portion is configured to, when the photosensitive member rotates at the slower speed, extract information corresponding to the part of the scanning lines from the information stored in the storage unit, to thereby calculate the correction value for correcting the positional deviation amount of the predetermined scanning line.

According to the present invention, an image defect, e.g., banding and color misregistration can be reduced even when the thinning control is performed.

Further features of the present invention will become apparent from the following description of exemplary embodiments with reference to the attached drawings.

BRIEF DESCRIPTION OF THE DRAWINGS

FIG. 1A is a view for illustrating an entire image forming apparatus according to an embodiment of the present invention.

FIG. 1B is a view for illustrating a configuration of the periphery of a photosensitive drum and a light scanning device.

FIG. 5 is a block diagram for illustrating a step of storing information in a memory according to the embodiment.

FIG. 12A, FIG. 12B, FIG. 12C, and FIG. 12D are each a graph for showing coordinate transformation of pixel positions in the sub-scanning direction according to the embodiment.

FIG. 15 is an illustration of a filter calculation portion 405 according to the embodiment.

FIG. 19 is a diagram for showing a conversion table for converting image data (density data) into drive data for generating a PWM signal.

DESCRIPTION OF THE EMBODIMENTS

Figure 2:
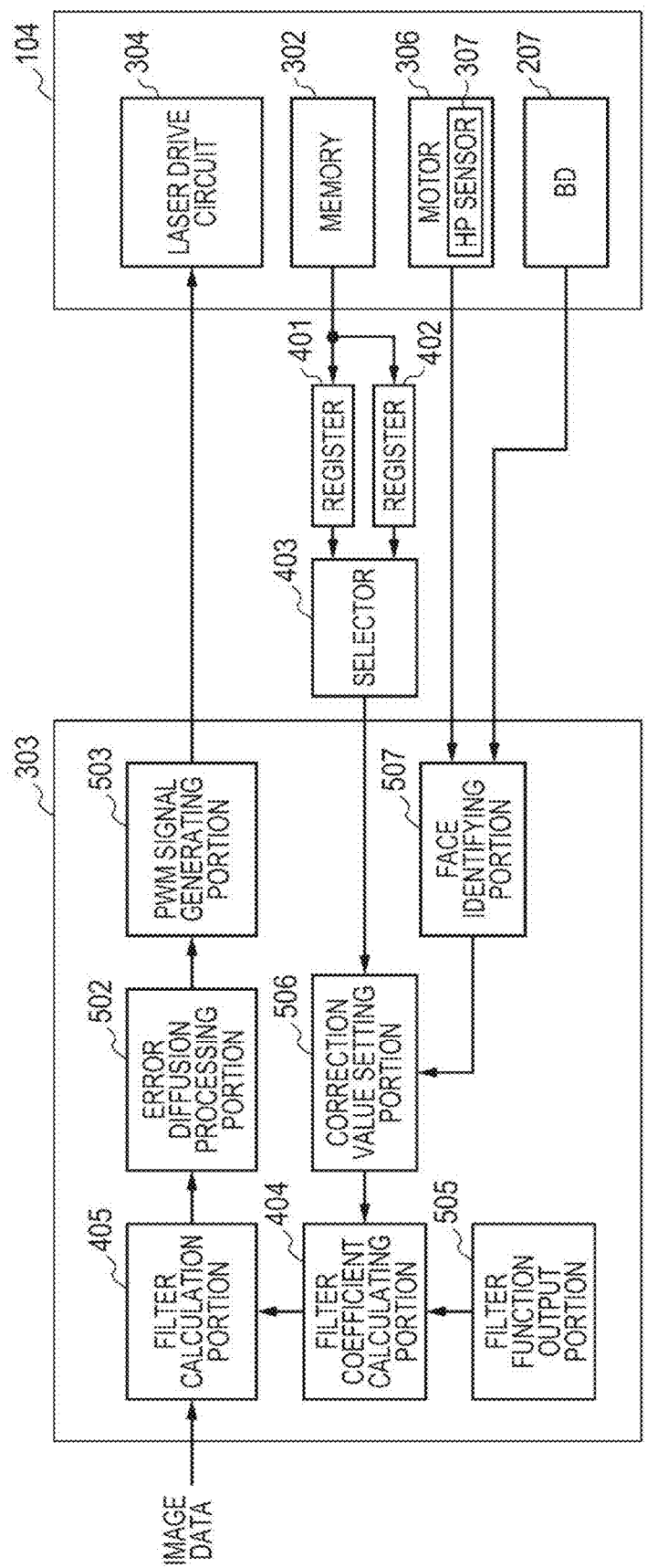
FIG. 2 is a block diagram of the image forming apparatus according to the embodiment.

An embodiment of the present invention is described in detail below in an illustrative manner with reference to the drawings. A direction of an axis of rotation of a photosensitive drum, which is a direction in which scanning is performed with a laser beam, is defined as a main scanning direction that is a second direction, and a rotational direction of the photosensitive drum, which is a direction substantially orthogonal to the main scanning direction, is defined as a sub-scanning direction that is a first direction.

Embodiment

<Overall Configuration of Image Forming Apparatus>

FIG. 1A is a schematic cross-sectional view of a digital full-color printer (color image forming apparatus) configured to perform image formation by using toners of a plurality of colors. An image forming apparatus 100 according to an embodiment of the present invention is described with reference to FIG. 1A. The image forming apparatus 100 includes four image forming portions (image forming units) 101Y, 101M, 101C, and 101Bk (broken line portions) respectively configured to form images of different colors. The image forming portions 101Y, 101M, 101C, and 101Bk form images by using toners of yellow, magenta, cyan, and black, respectively. Reference symbols Y, M, C, and Bk denote yellow, magenta, cyan, and black, respectively, and suffixes Y, M, C, and Bk are omitted in the description below unless a particular color is described.

The image forming portions 101 each include a photosensitive drum 102, being a photosensitive member. A charging device 103, a light scanning device 104, and a developing device 105 are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A while forming an image. Primary transfer devices 111 are arranged at positions opposed to the photosensitive drums 102 across the intermediate transfer belt 107 (intermediate transfer member). The image forming apparatus 100 according to this embodiment further includes a secondary transfer device 112 configured to transfer a toner image on the intermediate transfer belt 107 onto a sheet S being a recording medium and a fixing device 113 configured to fix the toner image on the sheet S.

An image forming process from a charging step to a developing step of the image forming apparatus 100 is described. The image forming process is the same in each of the image forming portions 101, and hence the image forming process is described with reference to an example of the image forming portion 101Y. Accordingly, descriptions of the image forming processes in the image forming portions 101M, 101C, and 101Bk are omitted. The photosensitive drum 102Y that is driven to rotate in the arrow direction illustrated in FIG. 1A (counterclockwise direction) is charged by the charging device 103Y of the image forming portion 101Y. The charged photosensitive drum 102Y is exposed by a laser beam emitted from the light scanning device 104Y, which is indicated by the dashed dotted line. With this operation, an electrostatic latent image is formed on the rotating photosensitive drum 102Y (on the photosensitive member). The electrostatic latent image formed on the photosensitive drum 102Y is developed as a toner image of yellow by the developing device 105Y. The same step is performed also in the image forming portions 101M, 101C, and 101Bk.

The image forming process from a transfer step is described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a delivery portion 116.

<Description of Normal Control and Face Skipping Control>

The image forming apparatus generally performs scanning of a laser beam through use of all the faces of a rotary polygon mirror. A mode of performing scanning of a laser beam through use of all the faces of the rotary polygon mirror is hereinafter referred to as "normal mode". When printing is performed on a recording material having high heat capacity, e.g., a cardboard, face skipping control involving performing image formation by changing a process speed may be performed, separately from the normal mode. In this embodiment, the case in which the face skipping control is performed at half the speed of a printing speed at a time of the normal mode is described, and a mode of performing such face skipping control is referred to as "half-speed mode". In the face skipping control, in order to eliminate a time (hereinafter referred to as "down time") required to change the rotation speed of a motor of the rotary polygon mirror (hereinafter referred to as "speed change"), the printing speed is decreased while the rotation speed of the rotary polygon mirror is kept normal. At a time of the face skipping control, for example, the rotation speed of the photosensitive drum 102 and the process speed, e.g., a conveyance speed of a sheet, are changed to half speeds slower than a predetermined speed at a time of the normal mode. As control of adjusting the rotation speed of the rotary polygon mirror to the process speed while the rotation speed is kept normal, there is also beam skipping control, and the face skipping control, the beam skipping control, and other such control are referred to as thinning control. The thinning control can also be considered as control of irradiating the photosensitive drum 102 with a light beam through use of part of scanning lines corresponding to the process speed at a time of the half-speed mode from among a plurality of scanning lines formed on the photosensitive drum 102 when the photosensitive drum 102 rotates at a speed in the normal mode.

In the face skipping control, light exposure is performed once for a plurality of times of scanning. For example, in the half-speed mode of the rotary polygon mirror having four reflection mirror faces for reflecting a laser beam, scanning of a laser beam is performed as described below. After scanning of a laser beam with the first face of the rotary polygon mirror is performed, scanning is not performed with the second face, scanning is performed with the third face, and scanning is not performed with the fourth face. For example, in a rotary polygon mirror having four mirror faces, the faces to be used for scanning of a laser beam are skipped on a one-by-one basis, and scanning of a laser beam is performed once for every two times of scanning. In the face skipping control, the mirror faces to be used for scanning of a laser beam are arbitrarily skipped (thinned) in accordance with the process speed to be changed, to thereby perform scanning of a laser beam. Through the face skipping control, the printing speed can be changed without changing the rotation speed of the rotary polygon mirror.

<Photosensitive Drum and Light Scanning Device>

FIG. 1B is an illustration of configurations of the photosensitive drum 102, the light scanning device 104, and a controller for the light scanning device 104. The light scanning device 104 includes a laser light source 201, a collimator lens 202, a cylindrical lens 203, and a rotary polygon mirror 204. The laser light source 201 includes a plurality of light emission points. The plurality of light emission points are each configured to emit a laser beam (light beam). The collimator lens 202 is configured to collimate the laser beam. The cylindrical lens 203 condenses the laser beam having passed through the collimator lens 202 in a sub-scanning direction. In this embodiment, the laser light source 201 is described by exemplifying a light source in which a plurality of light emission points are arranged, but is similarly operated also in the case of using a single light source. The laser light source 201 is driven by a laser drive circuit 304. The rotary polygon mirror 204 is formed of a motor portion configured to be operated to rotate and a reflection mirror mounted on a motor shaft. A face of the reflection mirror of the rotary polygon mirror 204 is hereinafter referred to as "mirror face". The rotary polygon mirror 204 is driven by a rotary polygon mirror drive portion 305. The light scanning device 104 includes fθ lenses 205 and 206 configured to receive a laser beam (scanning light) deflected by the rotary polygon mirror 204. Further, the light scanning device 104 includes a memory 302 configured to store various pieces of information.

The light scanning device 104 includes a beam detector 207 (hereinafter referred to as "BD 207") that is a signal generating unit configured to detect the laser beam deflected by the rotary polygon mirror 204 and output a horizontal synchronization signal (hereinafter referred to as "BD signal") in accordance with the detection of the laser beam. The laser beam output from the light scanning device 104 scans the photosensitive drum 102. The main scanning direction is substantially parallel to the rotary shaft of the photosensitive drum 102. Every time the mirror face of the rotary polygon mirror 204 scans the photosensitive drum 102, the light scanning device 104 causes a laser beam emitted from the laser light source to move (scan the photosensitive drum 102) in the main scanning direction, to thereby form scanning lines corresponding to the number of laser elements simultaneously. In this embodiment, a configuration is described in which the rotary polygon mirror 204 has four mirror faces, and the laser light source 201 includes eight laser elements, as an example. That is, in this embodiment, an image of eight lines is formed with one mirror face of the rotary polygon mirror 204, that is, with one scanning of the laser beam. In the normal mode using all the mirror faces of the rotary polygon mirror 204, the rotary polygon mirror 204 scans the photosensitive drum 102 with a laser beam four times per rotation, to thereby form an image of 32 lines. In a mode using the face skipping control, for example, the half-speed mode, the second and fourth faces of the rotary polygon mirror 204 are not used for scanning of a laser beam, and the first and third faces are used for scanning of a laser beam. The rotary polygon mirror 204 scans the photosensitive drum 102 with a laser beam twice per rotation, to thereby form an image of sixteen lines.

The photosensitive drum 102 includes a rotary encoder 301 on the rotary shaft, and the rotation speed of the photosensitive drum 102 is detected through use of the rotary encoder 301. The rotary encoder 301 generates 1,000 pulses per rotation of the photosensitive drum 102. In the rotary encoder 301, a measuring portion (not shown) configured to measure a time interval of pulses is arranged on an internal board. The rotary encoder 301 outputs information (rotation speed data) on the rotation speed of the photosensitive drum 102 to a CPU 303 based on the time interval of pulses measured by the measuring portion. A known speed detection technology other than the above-mentioned rotary encoder 301 may be used as long as the rotation speed of the photosensitive drum 102 can be detected. As a method other than the use of the rotary encoder 301, there is given, for example, a configuration to detect the surface speed of the photosensitive drum 102 with a laser Doppler. Registers 401 and 402 and a selector 403 are described later.

Next, the CPU 303 serving as a controller and a clock signal generating portion 308 are described with reference to FIG. 2. The CPU 303 and the clock signal generating portion 308 are mounted on the image forming apparatus 100. FIG. 2 is a block diagram for illustrating the functions of the CPU 303 configured to execute correction processing of correcting distortion and uneven image density of an image as a correction unit, a conversion unit, and a filtering unit. The CPU 303 includes a filter calculation portion 405, an error diffusion processing portion 502, and a PWM signal generating portion 503. The filter calculation portion 405 is configured to perform filtering by subjecting input image data to a convolution calculation. The error diffusion processing portion 502 is configured to subject the image data after the filtering to error diffusion processing. The PWM signal generating portion 503 is configured to subject the image data (density data) after the error diffusion processing to PWM transformation and output a PWM signal to the laser drive circuit 304 of the light scanning device 104. The clock signal generating portion 308 is configured to output a clock signal CLK(1) and a clock signal CLK(2) to the CPU 303. The clock signal CLK(1) is a clock signal illustrated in FIG. 6A and FIG. 6B described later. The clock signal CLK(1) is a signal generated by multiplying the clock signal CLK(2). Thus, the clock signal CLK(1) and the clock signal CLK(2) have a synchronization relationship. In this embodiment, the clock signal generating portion 308 outputs the clock signal CLK(1) generated by multiplying the clock signal CLK(2) by 16 to the CPU 303. The clock signal CLK(2) is a signal having a period corresponding to one pixel. The clock signal CLK(1) is a signal having a period corresponding to divided pixels obtained by dividing one pixel by 16.

The CPU 303 includes a filter coefficient calculating portion 404, a filter function output portion 505, and a correction value setting portion 506. The filter function output portion 505 is configured to output data on a function to be used for a convolution calculation (for example, data in a table) to the filter coefficient calculating portion 404. As a function to be used for the convolution calculation, there is given, for example, linear interpolation and bicubic interpolation. The correction value setting portion 506 calculates a positional deviation amount of a scanning line based on the information on the positional deviation amount read from the register 401 or 402 through the selector 403 and a face synchronization signal input from a face identifying portion 507. Predetermined information is stored in the registers 401 and 402 from the memory 302 of the light scanning device 104 when power is turned on. The correction value setting portion 506 then calculates a correction value based on the positional deviation amount of the scanning line and outputs the calculated correction value to the filter coefficient calculating portion 404. The filter coefficient calculating portion 404 is configured to calculate a filter coefficient based on information on the convolution function input from the filter function output portion 505 and the correction value of the scanning line input from the correction value setting portion 506. The filter coefficient is used for filtering in the filter calculation portion 405. The filter coefficient calculating portion 404 sets the calculated filter coefficient to the filter calculation portion 405.

The CPU 303 includes the face identifying portion 507. The face identifying portion 507 is configured to identify a mirror face of the rotary polygon mirror 204 based on an HP signal input from a home position sensor (hereinafter referred to as "HP sensor") 307 of the light scanning device 104 and the BD signal input from the BD 207. The face identifying portion 507 is configured to output information of the identified mirror face to the correction value setting portion 506 as a face synchronization signal.

As illustrated in FIG. 1B, the CPU 303 is configured to receive image data from an image controller (not shown) configured to generate image data. This image data is gradation data indicating a density value. The gradation data is data of a plurality of bits indicating a density value for each pixel. For example, in the case of image data of 4 bits, a density value of one pixel is expressed by 16 gradations, and in the case of image data of 8 bits, a density value of one pixel is expressed by 256 gradations. In this embodiment, the image data input to the CPU 303 from the image controller is 4 bits per pixel. The filter calculation portion 501 is configured to subject the image data to filtering for each pixel in synchronization with the clock signal CLK(2). The CPU 303 is connected to the rotary encoder 301, the BD 207, the memory 302, and the rotary polygon mirror drive portion (hereinafter referred to as "mirror drive portion") 305. The CPU 303 is configured to detect a write position of a scanning line based on the BD signal input from the BD 207 and count a time interval of the BD signal, to thereby detect the rotation speed of the rotary polygon mirror 204. Further, the CPU 303 is configured to output an acceleration or deceleration signal for designating acceleration or deceleration to the mirror drive portion 305 so that the rotary polygon mirror 204 reaches a predetermined speed. The mirror drive portion 305 is configured to supply a driving current to the motor portion of the rotary polygon mirror 204 in accordance with the acceleration or deceleration signal input from the CPU 303, to thereby drive a motor 306.

As illustrated in FIG. 2, the HP sensor 307 is mounted on the rotary polygon mirror 204. The HP sensor 307 is configured to output the HP signal to the CPU 303 at timing at which the rotary polygon mirror 204 reaches a predetermined angle during a rotation operation. For example, the HP signal is generated once during every rotation of the rotary polygon mirror 204. The face identifying portion 507 resets an internal counter in response to the generation of the HP signal. Then, the face identifying portion 507 increments a count value of the internal counter by "1" every time the BD signal is input. That is, the count value of the internal counter is information indicating one of the plurality of mirror faces of the rotary polygon mirror 204. The CPU 303 can identify which of the plurality of mirror faces the input image data corresponds to through use of the count value. That is, the CPU 303 can switch a filter coefficient for correcting the input image data through use of the count value.

The memory 302 is configured to store, for each mirror face, position information (first scanning position information) indicating positional deviation amounts from ideal scanning positions in the sub-scanning direction of a plurality of laser beams reflected by the mirror faces of the rotary polygon mirror 204. Further, the memory 302 is configured to store position information (second scanning position information) indicating a positional deviation amount from the ideal scanning position in the sub-scanning direction of the laser beam caused by arrangement intervals of each light emission point. Each of the first scanning position information and the second scanning position information is read by the CPU 303 and stored in the registers 401 and 402. The CPU 303 reads information on positional deviation in the sub-scanning direction caused by an optical face tangle error of each mirror face of the rotary polygon mirror 204 and information on positional deviation from an ideal position in the sub-scanning direction of 1,200 dpi caused by an interval between the light emission points of the laser light source 201 from the register 401 or 402. The CPU 303 calculates position information of each scanning line based on the positional deviation information read from the register 401 or 402. The positional deviation information of each scanning line to be used for the normal mode is stored in the register 401 serving as a first register. The positional deviation information of the scanning lines to be used for the face skipping control is stored in the register 402 serving as a second register.

The selector 403 outputs the information stored in any one of the register 401 or 402 to the correction value setting portion 506 in accordance with an instruction signal input from the CPU 303. The correction value setting portion 506 calculates a correction value based on the position information of each scanning line input from the register 401 or 402 through the selector 403 and outputs the calculated correction value to the filter coefficient calculating portion 404. The filter coefficient calculating portion 404 calculates a filter coefficient through use of the correction value input from the correction value setting portion 506 and a filter function input from the filter function output portion 505.

The filter calculation portion 405 receives image data from an image controller configured to generate image data (not shown). The filter calculation portion 405 subjects the image data to the filtering based on the filter coefficient input from the filter coefficient calculating portion 404, to thereby calculate image data taking the information for correcting the position of each scanning line into account. The PWM signal generating portion 503 of the CPU 303 is configured to convert the image data taking the information for correcting the position of each scanning line into account into drive data. A ROM is configured to store a conversion table for converting image data of 4 bits into drive data of 16 bits as shown in FIG. 19. A vertical axis of the conversion table shown in FIG. 19 represents image data indicating density values of 4 bits, which corresponds to one pixel. A horizontal axis of the conversion table shown in FIG. 19 represents drive data of 16 bits associated with the density values of 4 bits individually. For example, in the case where image data input to the PWM signal generating portion 503 is a bit pattern of "0110", the PWM signal generating portion 503 converts the image data "0110" into drive data that is a bit pattern of "0000000001111111" through use of the conversion table. The PWM signal generating portion 503 outputs the converted drive data in the order of "0000000001111111" serially on a bit basis in accordance with the clock signal (1) described later. When the PWM signal generating portion 503 outputs the drive data, a PWM signal is generated. When the PWM signal generating portion 503 outputs "1", a light emission point emits a laser beam. When the PWM signal generating portion 503 outputs "0", a light emission point does not output a laser beam.

Figure 3:
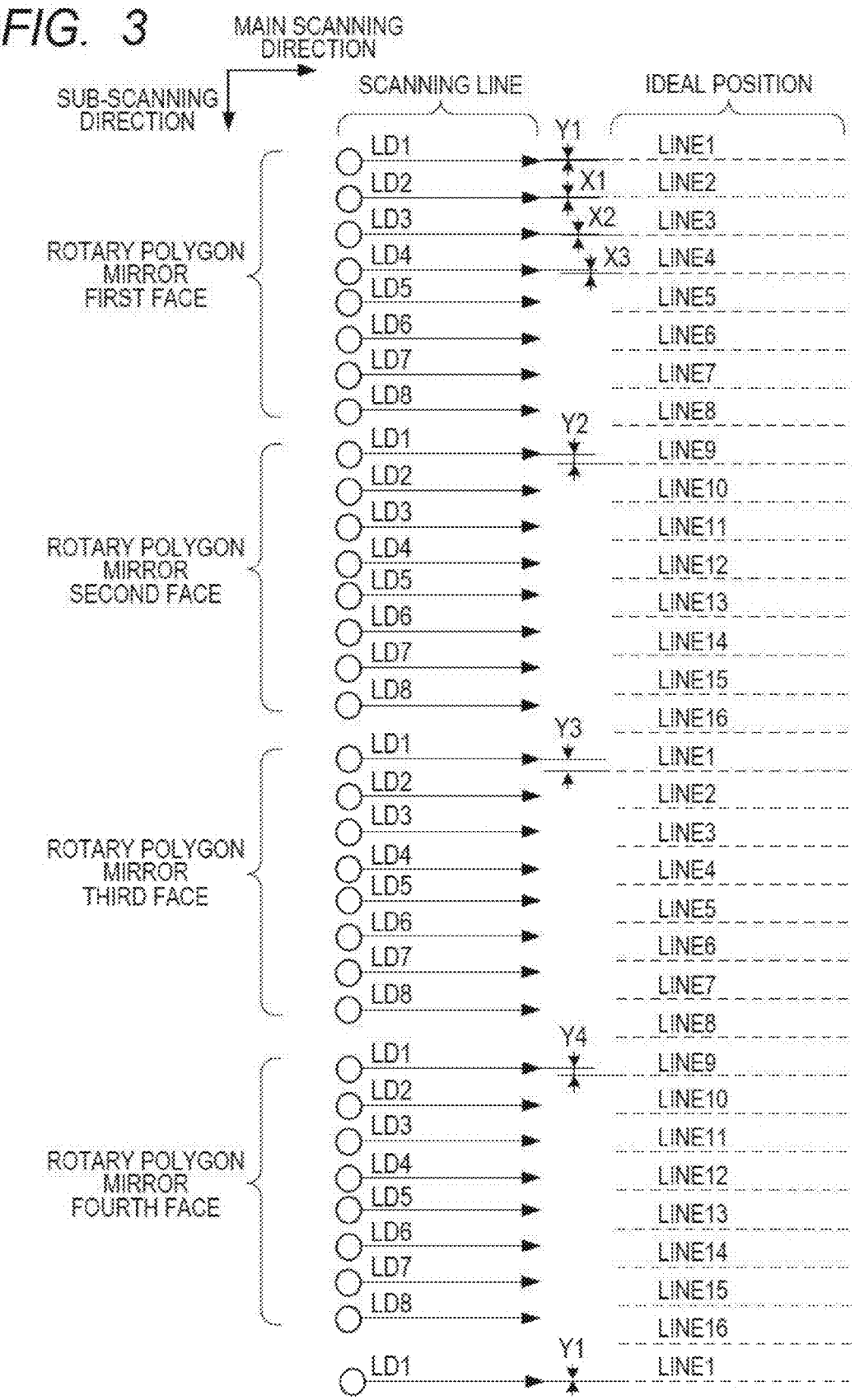
FIG. 3 is an illustration of positional deviation of scanning lines at a time of normal control according to the embodiment.
Figure 4:
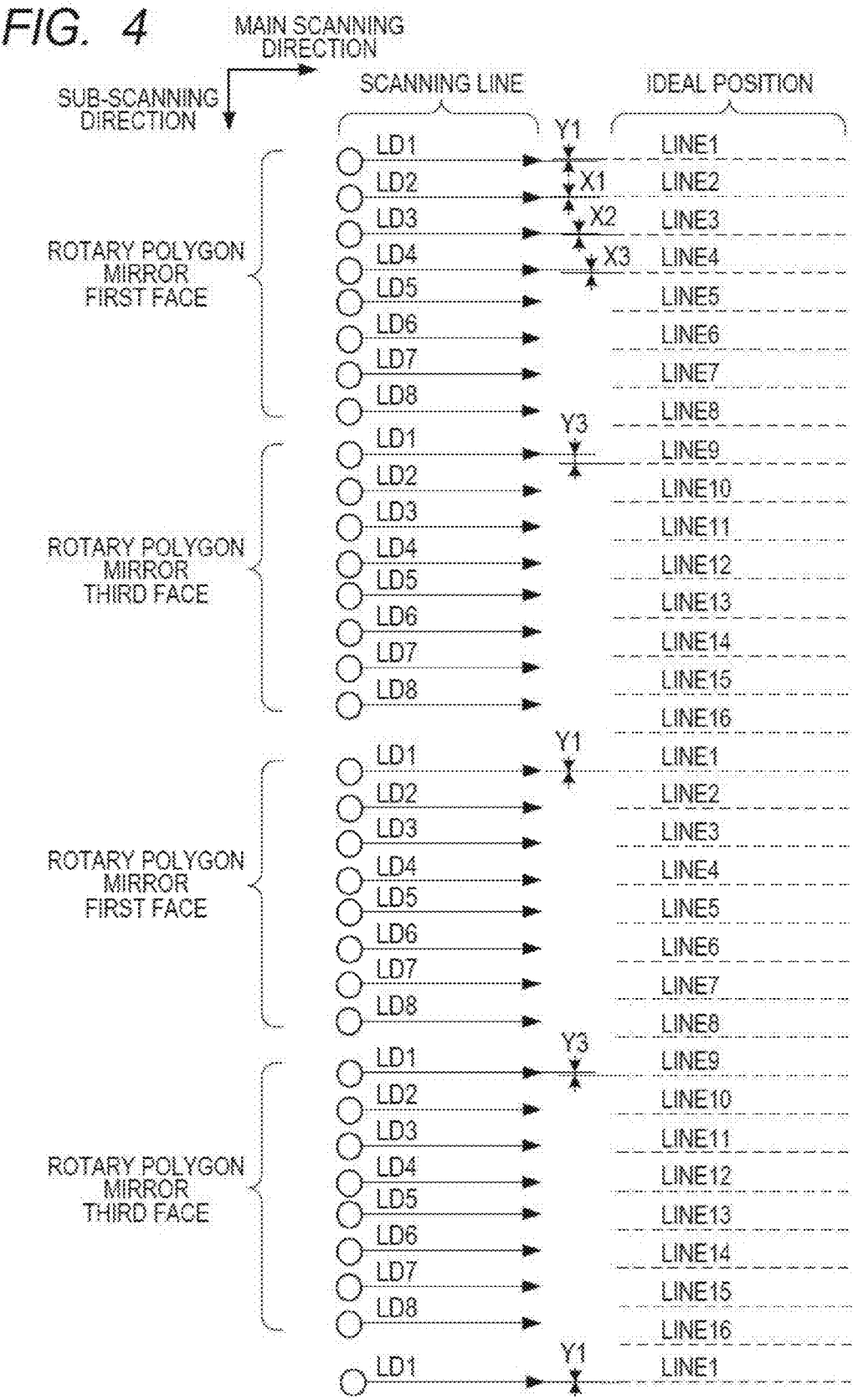
FIG. 4 is an illustration of positional deviation of scanning lines at a time of face skipping control according to the embodiment.

Next, scanning position information stored in the registers 401 and 402 is described with reference to FIG. 3 and FIG. 4. FIG. 3 and FIG. 4 are illustrations of a state of positional deviation of each scanning line from an ideal position. FIG. 3 is an illustration of a positional deviation state of the scanning lines at a time of the normal mode (when all the mirror faces of the rotary polygon mirror 204 are used). FIG. 4 is an illustration of a positional deviation state of the scanning lines at a time of the half-speed mode (when the face skipping control is performed). Scanning lines scanned by each laser beam emitted from the laser light source having eight light emission points are denoted by LD1, LD2, LD3, LD4, LD5, LD6, LD7, and LD8. An ideal interval (predetermined interval) between the respective scanning lines is determined based on a resolution. For example, in the case of an image forming apparatus having a resolution of 1,200 dpi, an ideal interval between the respective scanning lines is 21.16 μm. When the scanning line LD1 is defined as a reference position, ideal distances D2 to D8 of the scanning lines LD2 to LD8 from the scanning line LD1 are calculated by Expression (1).

$$Dn=(n-1)\times 21.16 \text{ μm } (n=2 \text{ to } 8) \qquad \text{Expression (1)}$$

For example, the ideal distance D4 from the scanning line LD1 to the scanning line LD4 is 63.48 μm (=(4−1)×21.16 μm).

An interval between the scanning lines on the photosensitive drum 102 has an error due to an error of arrangement intervals of the plurality of light emission points and characteristics of a lens. The positional deviation amounts of the scanning line positions of the scanning lines LD2 to LD8 with respect to ideal positions determined based on the ideal distances D2 to D8 are denoted by X1 to X7. Regarding the first face of the rotary polygon mirror 204, for example, the positional deviation amount X1 of the scanning line LD2 is defined as a difference between the ideal position of the scanning line LD2 (hereinafter referred to as "LINE 2", which similarly applies to the other scanning lines) and the actual scanning line. Further, for example, the positional deviation amount X3 of the scanning line LD4 is defined as a difference between the LINE 4 and the actual scanning line.

Due to a variation in manufacturing of each mirror face of the rotary polygon mirror 204, the mirror faces are not completely parallel to the rotary shaft of the rotary polygon mirror 204, and the rotary polygon mirror 204 has an angle variation for each mirror face. The positional deviation amounts with respect to the ideal positions in each mirror face of the rotary polygon mirror 204 are denoted by Y1 to Y4 when the number of the mirror faces of the rotary polygon mirror 204 is four. In FIG. 3, a deviation amount of the scanning line LD1 from the ideal position in the first face is denoted by Y1, and a deviation amount of the scanning line LD1 from the ideal position in the second face is denoted by Y2.

A mirror face of the rotary polygon mirror 204 is defined as an m-th face, and a positional deviation amount of a scanning line (LDn) by an n-th laser beam from the laser light source is denoted by Zmn. Then, the positional deviation amount Zmn is represented by Expression (2) through use of the positional deviation amounts X1 to X7 of each scanning line and the positional deviation amounts Y1 to Y4 of each mirror face.

$$Zmn = Ym + X(n-1) \quad (m=1 \text{ to } 4, n=1 \text{ to } 8) \quad \text{Expression (2)}$$

where $X(0)=0$

For example, a positional deviation amount Z14 regarding the scanning line LD4 in the first face of the rotary polygon mirror 204 is determined to be $Z14=Y1+X3$ by Expression (2). A positional deviation amount Z21 regarding the scanning line LD1 in the second face of the rotary polygon mirror 204 is determined to be $Z21=Y2$ by Expression (2).

When the positional deviation amount Zmn is calculated by Expression (2), it is only necessary that the number of pieces of data to be used for calculating the positional deviation amount Zmn correspond to the number of the mirror faces of the rotary polygon mirror 204 and the number of light emission points of the laser light source. An address map of positional deviation data stored in the register 401 is shown in Table 1.

TABLE 1

| Address | Data |
|---|---|
| 1 | LD2 Position Information X1 |
| 2 | LD3 Position Information X2 |
| 3 | LD4 Position Information X3 |
| 4 | LD5 Position Information X4 |
| 5 | LD6 Position Information X5 |
| 6 | LD7 Position Information X6 |
| 7 | LD8 Position Information X7 |
| 8 | First Face Position Information Y1 |
| 9 | Second Face Position Information Y2 |
| 10 | Third Face Position Information Y3 |
| 11 | Fourth Face Position Information Y4 |

As shown in Table 1, information on the respective positional deviation amounts (described as position information) X1 to X7 of the scanning line LD2 to the scanning line LD8 is stored in from an address 1 to an address 7 of the register 401. Information on the respective positional deviation amounts Y1 to Y4 of the first face to the fourth face of the mirror faces of the rotary polygon mirror 204 is stored in from an address 8 to an address 11 of the register 401.

An address map of positional deviation data stored in the register 402 is shown in Table 2.

TABLE 2

| Address | Data |
|---|---|
| 1 | LD2 Position Information X1 |
| 2 | LD3 Position Information X2 |
| 3 | LD4 Position Information X3 |
| 4 | LD5 Position Information X4 |
| 5 | LD6 Position Information X5 |
| 6 | LD7 Position Information X6 |
| 7 | LD8 Position Information X7 |
| 8 | First Face Position Information Y1 |
| 9 | Third Face Position Information Y3 |

As shown in Table 2, information on the respective positional deviation amounts (described as position information) X1 to X7 of the scanning line LD2 to the scanning line LD8 is stored in from an address 1 to an address 7 of the register 402. Further, information on the respective positional deviation amounts Y1 and Y3 of the first face and the third face of the mirror faces of the rotary polygon mirror 204 is stored in an address 8 and an address 9 of the register 402.

In this embodiment, description is given on the assumption that the eight scanning lines of each laser beam are deviated uniformly due to the positional deviation of each mirror face of the rotary polygon mirror 204. That is, in this embodiment, eleven pieces of position information are stored in the register 401 and nine pieces of position information are stored in the register 402. However, when there is a variation in positional deviation amount of each scanning line of a laser beam for each mirror face of the rotary polygon mirror 204, there may be stored information on a positional deviation amount only for a combination of each mirror face of the rotary polygon mirror 204 and each scanning line of the laser beam. That is, in this case, 32 pieces of position information are stored in the memory 302, with the number of the mirror faces of the rotary polygon mirror 204 being four and the number of light emission points of the laser light source 201 being eight, to be read out and stored in the register 401. A required number of pieces of position information is stored in the register 402 from the memory 302 in accordance with the faces to be used for the face skipping control.

In this embodiment, which position information of the register 401 or 402 is referred to varies depending on whether the normal mode or the half-speed mode is performed. In the control at a time of the normal mode of performing scanning of a laser beam through use of all the mirror faces of the rotary polygon mirror 204, the CPU 303 refers to the information stored in the register 401. As shown in Table 1, the register 401 stores information on the positional deviation amounts of the scanning lines when all the four mirror faces of the rotary polygon mirror 204 are used. In the face skipping control at a time of the half-speed mode, the CPU 303 refers to the information stored in the register 402. As shown in Table 2, the register 402 stores information on the positional deviation amounts of the scanning lines when part of the mirror faces of the rotary polygon mirror 204 is used. In this embodiment, at a time of the face skipping control, image formation is performed at a half printing speed of that for the normal control through use of the first and third faces of the rotary polygon mirror 204. The CPU 303 extracts only information of the first and third faces to be used for scanning of a laser beam and stores the information in the register 402.

(Memory Storage Operation)

Information on a positional deviation amount to be stored in the memory 302, for example, is data measured in an adjustment step of the light scanning device 104 in a factory or the like. The image forming apparatus 100 may include a position detection unit configured to detect the position of a scanning line scanned with a laser beam emitted from the laser light source 201 so that the information stored in the memory 302 may be updated in real time. As the position detection unit configured to detect a position of scanning light in the sub-scanning direction, a known technology may be used. For example, a position may be detected by a CMOS sensor or a position sensitive detector (PSD) arranged in the light scanning device 104 or arranged near the photosensitive drum 102. Further, a triangular slit may be formed in a surface of a photo diode (PD) arranged in the light scanning device 104 or arranged on a scanning path of a laser beam near the photosensitive drum 102, to thereby detect a position from an output pulse width of the PD.

FIG. 5 is a block diagram for illustrating a step of storing information in the memory 302 of the light scanning device 104 in a factory as an example. The same configurations as those of FIG. 2 are denoted by the same reference symbols as those therein, and the description thereof is omitted. In the adjustment step for the light scanning device 104, a measuring instrument 400 is arranged at a position corresponding to the scanning position on the photosensitive drum 102 when the light scanning device 104 is mounted on the image forming apparatus 100. The measuring instrument 400 includes a measuring portion 410 and a calculation portion 422, and the calculation portion 422 is configured to receive a face synchronization signal from the face identifying portion 507 of the CPU 303 of FIG. 2. In the CPU 303 of FIG. 5, only the face identifying portion 507 is illustrated. First, a laser beam is radiated to the measuring portion 410 from the light scanning device 104. The measuring portion 410 includes a triangular slit 411 and a PD 412. A laser beam emitted from the light scanning device 104 indicated by the arrow with the alternate long and short dash line in FIG. 5 scans the triangular slit 411. The measuring portion 410 measures the position in the sub-scanning direction of a scanning line based on information on the laser beam input to the PD 412 through the triangular slit 411. The measuring portion 410 outputs information on the measured position in the sub-scanning direction of the scanning line in each mirror face (hereinafter referred to as "data for each face") of the rotary polygon mirror 204 to the calculation portion 422.

The face identifying portion 507 is configured to receive the HP signal from the HP sensor 307 of the light scanning device 104 and receive the BD signal from the BD 207. With this, the face identifying portion 507 is configured to identify a mirror face of the rotary polygon mirror 204 and output information on the identified mirror face to the calculation portion 422 as a face synchronization signal. The calculation portion 422 is configured to write the information on the position in the sub-scanning direction of the scanning line measured by the measuring portion 410 into an address on the memory 302 of the light scanning device 104 in accordance with the information on the mirror face of the rotary polygon mirror 204 input from the face identifying portion 507. Thus, the information on the positional deviation amounts of the scanning lines caused by a variation in intervals between the eight light emission points of the laser light source 201 (X1 to X7) and the information on the positional deviation amounts of the scanning lines caused by an optical face tangle error of the mirror face of the rotary polygon mirror 204 (Y1 to Y4) are stored in the memory 302.

<Calculation Method for Positional Deviation Amount at Time of Normal Control>

Figure 6A:
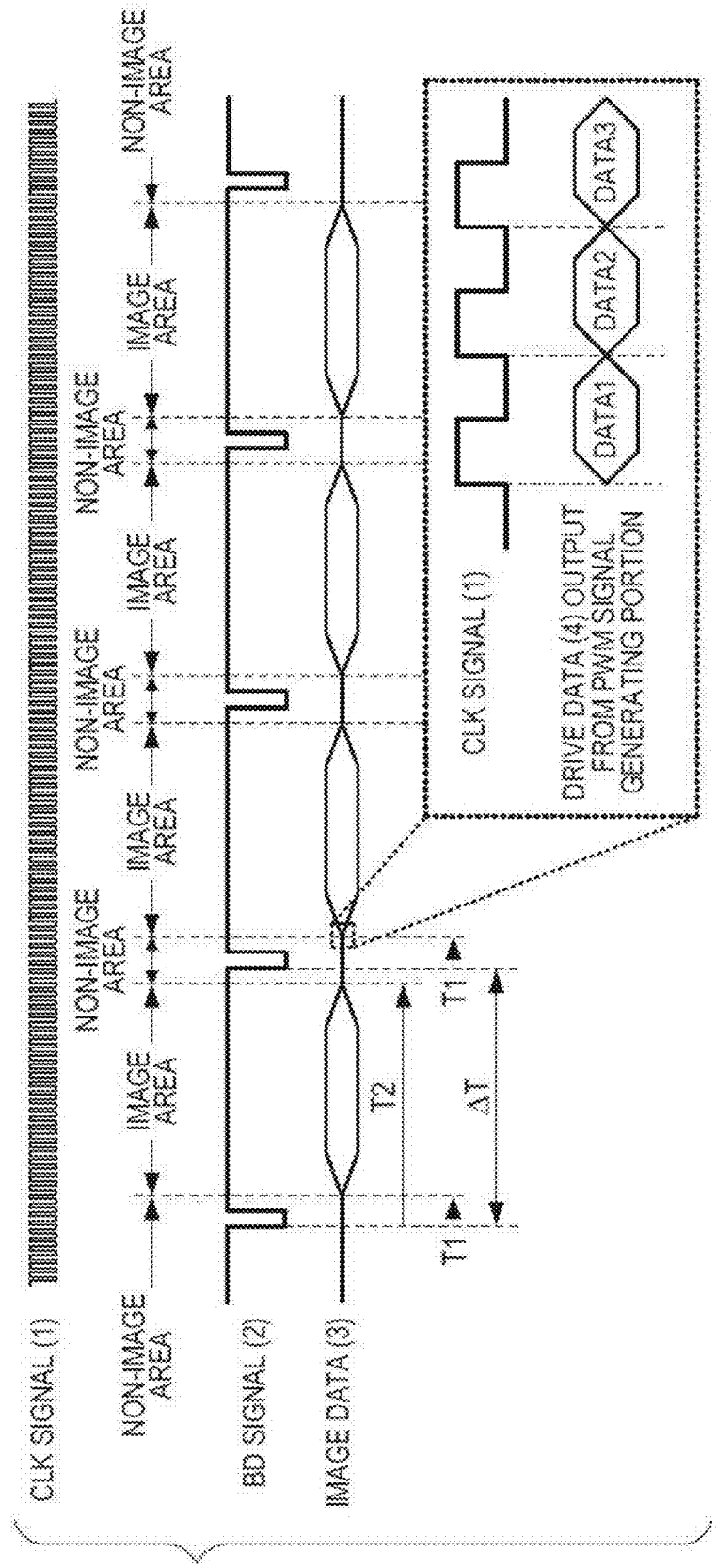
FIG. 6A is a time chart at a time of the normal control according to the embodiment.

FIG. 6A is an illustration of control timing in one scanning period of a laser beam at a time of the normal mode (normal control) in this embodiment. (1) represents a CLK signal corresponding to a pixel period per divided pixel (1/16 pixel) obtained by dividing one pixel by 16, and (2) represents input timing of the BD signal from the BD 207 to the CPU 303. (3) and (4) are each an illustration of timing at which the CPU 303 outputs drive data DATAn (n=1, 2, . . . ).

With the BD signal output from the BD 207 being a reference, during a period of time from timing at which the BD signal is input to the CPU 303 to timing at which a subsequent BD signal is input to the CPU 303, a period of time from timing at which the BD signal is input to the CPU 303 to timing at which the processing of the image data input to the CPU 303 is started is defined as T1. Further, during the period of time from timing at which the BD signal is input to the CPU 303 to timing at which a subsequent BD signal is input to the CPU 303, a period of time from timing at which the BD signal is input to the CPU 303 to timing at which the output of the image data input to the CPU 303 is completed is defined as T2. After the BD signal is input to the CPU 303, the CPU 303 stands by until the predetermined period of time T1 elapses. Then, the CPU 303 starts the filtering of the input image data in synchronization with the clock signal CLK(2) to generate drive data successively from the processed image data and output the drive data on a bit basis, to thereby output the PWM signal to the laser drive circuit 304. Then, after the predetermined period of time T2 elapses from the input of the BD signal, the CPU 303 finishes the processing of the image data in one scanning line. The CPU 303 calculates, for each scanning, a positional deviation amount of the scanning line in the scanning period until the predetermined period of time T1 elapses from the detection of the BD signal, that is, while the laser beam scans a non-image area. Then, the CPU 303 causes the filter coefficient calculating portion 404 to set a filter coefficient based on the calculated positional deviation amount. Then, the CPU 303 causes, for each scanning, the filter calculation portion 405 to correct the image data through use of the filter coefficient set by the filter coefficient calculating portion 404 until the predetermined period of time T2 elapses from the elapse of the predetermined period of time T1.

<Calculation Method for Positional Deviation Amount at Time of Face Skipping Control>

Figure 6B:
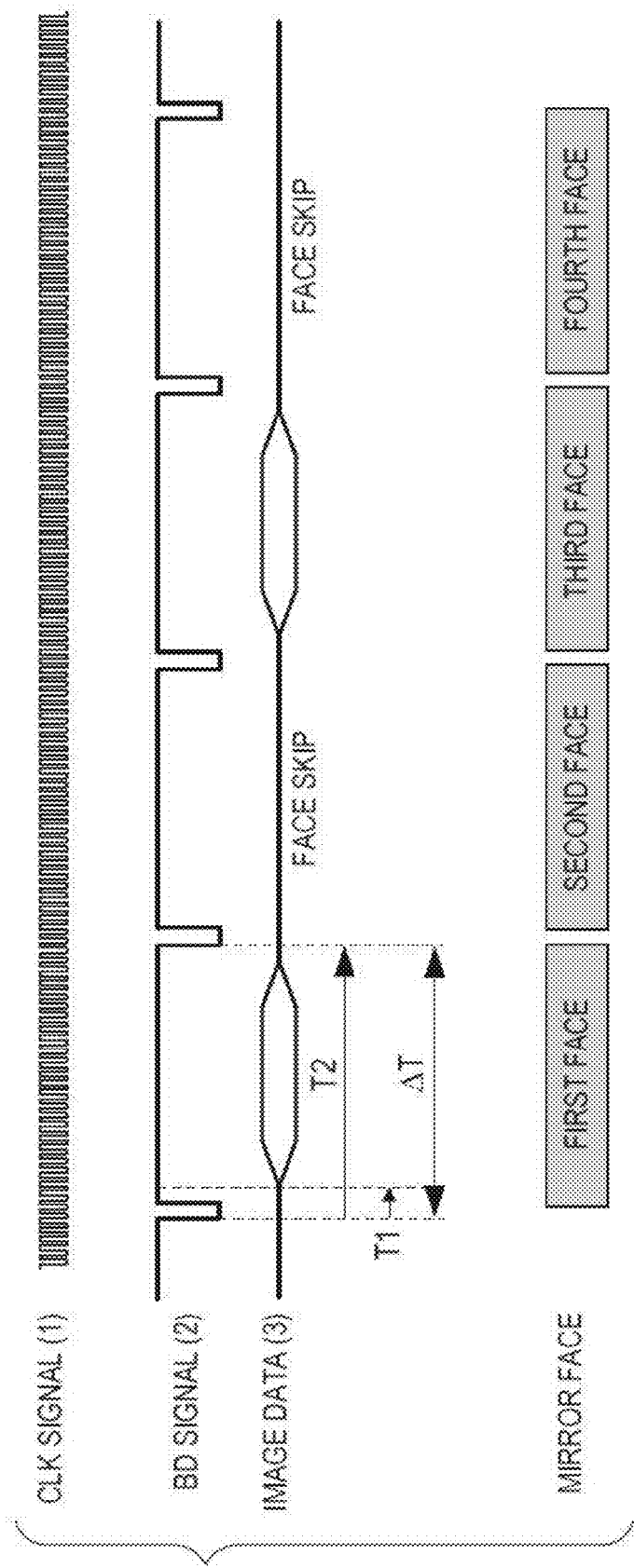
FIG. 6B is a time chart for illustrating one scanning period at a time of the face skipping control.

FIG. 6B is an illustration of control timing in four scanning periods in the half-speed mode using the rotary polygon mirror 204 having four mirror faces according to this embodiment, that is, at a time of the face skipping control. In this embodiment, when scanning of a laser beam is performed with the first and third faces of the rotary polygon mirror 204, image data DATAn' subjected to the filtering by the filter calculation portion 405 is sent to the laser drive circuit 304. The second and fourth faces of the rotary polygon mirror 204 are faces to be skipped by face skipping. Therefore, printing using the second and fourth faces is not performed, and hence image data is not sent. In the first and third faces, image data DATAn is output to the laser drive circuit 304 in synchronization with one clock in the same way as in FIG. 6A. The CPU 303 controls transmission timing of the image data to an image controller (not shown) based on the results obtained by identifying a face of the rotary polygon mirror 204 from detection timing of a home position by the HP sensor 307 of the motor 306, to thereby perform the face skipping control.

<Operation of CPU when Power is Turned on>

Figure 7:
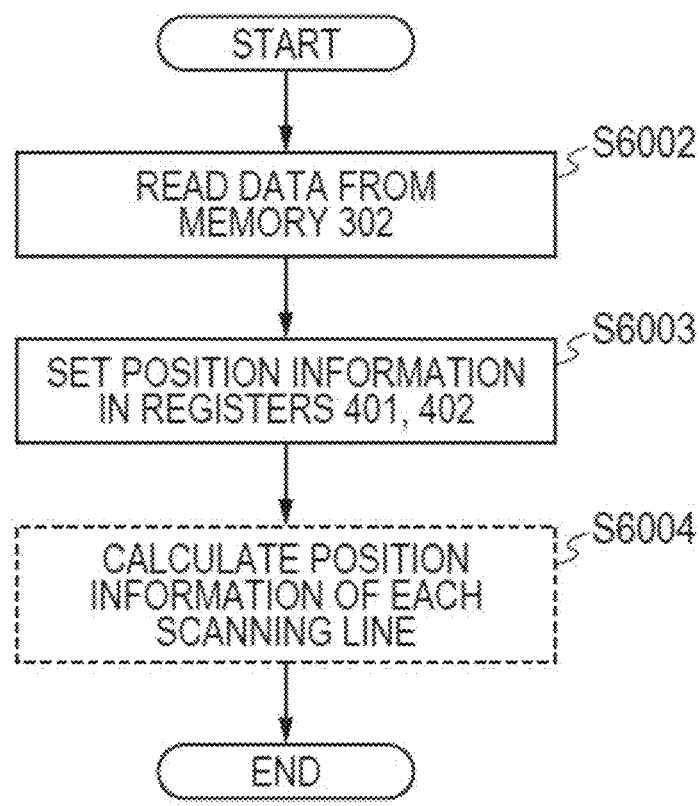
FIG. 7 is a flowchart for illustrating processing when power is turned on according to the embodiment.

FIG. 7 is an illustration of a flowchart of the processing performed by the CPU 303 when the power of the image forming apparatus is turned on. In Step S6002, the CPU 303 reads position information (e.g., position information Y1 to Y4) of each face of the rotary polygon mirror 204 and position information (e.g., position information X1 to X7) of the multibeam laser from the memory 302. In Step S6003, the CPU 303 stores the position information (Y1 to Y4, X1 to X7) read in Step S6002 in the registers 401 and 402. Specifically, the CPU 303 stores the position information (Y1 to Y4, X1 to X7) of all the mirror faces of the rotary polygon mirror 204 to be used for the normal control in the register 401. Further, the CPU 303 stores the position information (e.g., Y1, Y3, X1 to X7) of the corresponding mirror faces of the rotary polygon mirror 204 to be used for the face skipping control in the register 402 and finishes the processing. In this embodiment, as described with reference to FIG. 6A and FIG. 6B, an example in which a positional deviation amount (Zmn) is calculated during a period of time T1 is described. However, in Step S6004 represented by the broken line of FIG. 7, the CPU 303 may calculate the positional deviation amount (Zmn) of each scanning line by Expression (2) based on the position information of each face and the position information of each scanning line read from the register 401 or 402 in Step S6003.

When the image forming apparatus is operated in the half-speed mode, the CPU 303 calculates the position information of each scanning line as described below. That is, regarding the positional deviation amount Zmn at a time of the face skipping control, the CPU 303 extracts only information of the faces to be used for scanning of a laser beam based on each control, e.g., first face skipping or second face skipping, and calculates position information. For example, when the second and fourth faces of the rotary polygon mirror 204 are skipped as illustrated in FIG. 6B, the CPU 303 performs control as described below. That is, the CPU 303 calculates a positional deviation amount Z1n of a scanning line regarding the first face and a positional deviation amount Z3n regarding the third face by Expression (2) through use of the position information Y1 and Y3 of the mirror faces and the position information X1 to X7 of the scanning lines.

<Operation of CPU at Time of Printing Job>

Figure 8:
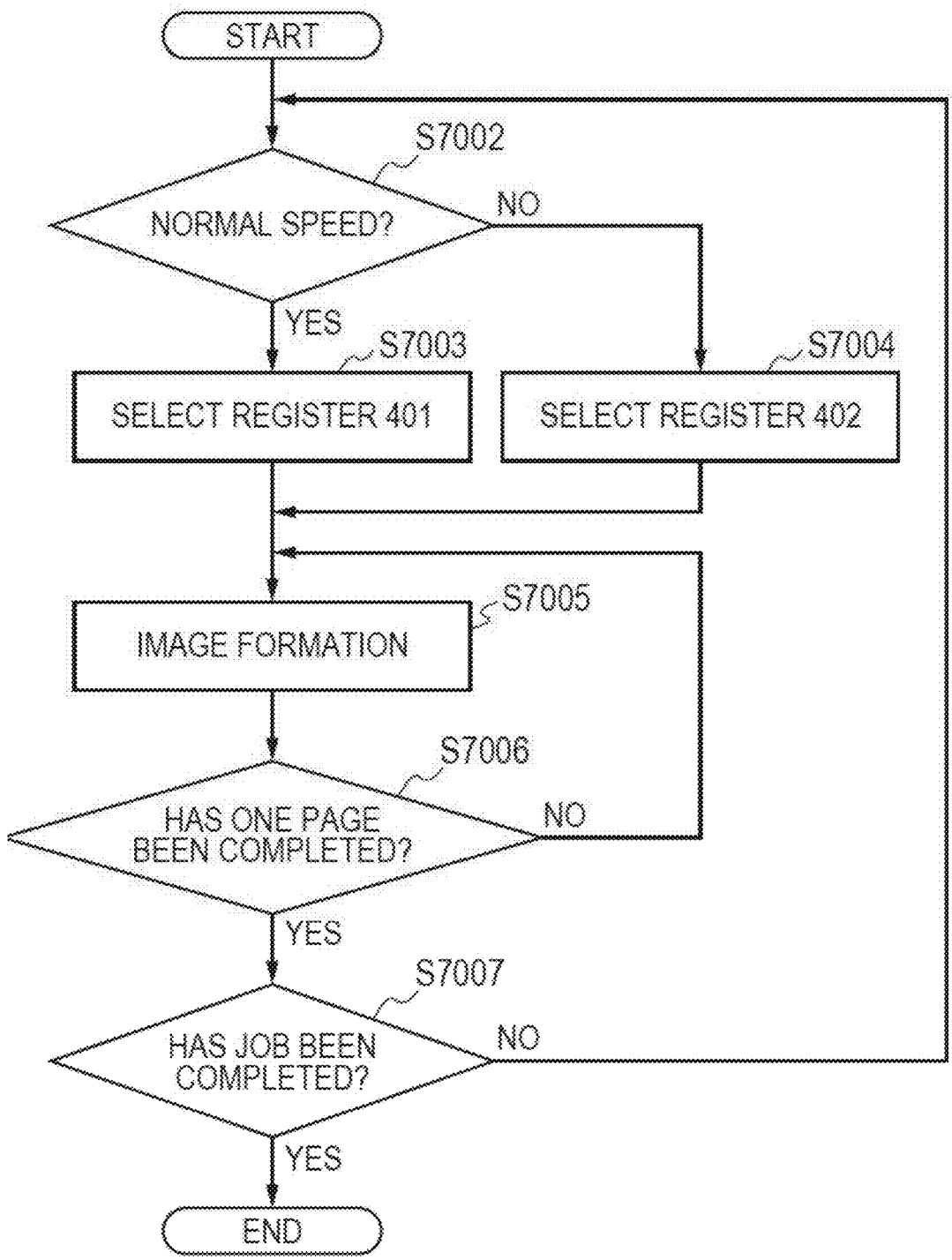
FIG. 8 is a flowchart for illustrating processing during image formation according to the embodiment.

FIG. 8 is a flowchart for illustrating the operation of the CPU 303 when a printing job (hereinafter simply referred to as "job") is started. When the job is started, the CPU 303 determines whether or not the started job is performed at a normal speed that is the printing speed of the normal mode in Step S7002. When the CPU 303 determines in Step S7002 that the printing speed is a normal speed, the CPU 303 proceeds to processing in Step S7003. When the CPU 303 determines in Step S7002 that the printing speed is not a normal speed, that is, the printing speed is a printing speed of the half-speed mode and the face skipping control is to be performed, the CPU 303 proceeds to processing in Step S7004. In Step S7003, the CPU 303 controls the selector 403 so that the information stored in the register 401, for example, the information shown in Table 1 is input to the correction value setting portion 506. In the case of the normal mode, the CPU 303 sets the process speed to a predetermined speed corresponding to the normal mode. In Step S7004, the CPU 303 controls the selector 403 so that the information stored in the register 402, for example, the information shown in Table 2 is input to the correction value setting portion 506. In the case of the half-speed mode, the CPU 303 sets the process speed to a half speed of a predetermined speed at a time of the normal mode.

In Step 7005, the CPU 303 performs image formation. In this case, when the CPU 303 determines in Step S7002 that the printing speed is a normal speed, for example, the CPU 303 causes scanning of a laser beam to be performed with all the mirror faces of the rotary polygon mirror 204 as illustrated in FIG. 6A, to thereby form a latent image on the photosensitive drum 102. Further, when the CPU 303 determines in Step S7002 that the printing speed is a half speed, for example, the CPU 303 causes scanning of a laser beam to be performed with the first and third faces of the rotary polygon mirror 204 as illustrated in FIG. 6B, to thereby form a latent image on the photosensitive drum 102. The details of Step S7005 are described later. In Step S7006, the CPU 303 determines whether or not the printing of one page has been completed. When the CPU 303 determines that the printing of one page has been completed, the CPU 303 proceeds to processing in Step S7007. When the CPU 303 determines that the printing of one page has not been completed, the CPU 303 returns to the processing in Step S7005. In Step S7007, the CPU 303 determines whether or not the job has been completed. When the CPU 303 determines in Step S7007 that the job has not been completed, the CPU 303 returns to the processing in Step S7002. When the CPU 303 determines in Step S7007 that the job has been completed, the CPU 303 finishes the processing.

<Filter Coefficient Calculation>

The calculation processing of a positional deviation amount performed during the image formation processing in Step S7005 of FIG. 8 is described with reference to FIG. 2. The correction value setting portion 506 receives the position information of each mirror face of the rotary polygon mirror 204 and the position information of the multibeam laser from the register 401 or 402 selected by the selector 403 during image formation. The correction value setting portion 506 calculates a correction value for a positional deviation amount based on the information input from the register 401 or 402 through the selector 403. The correction value setting portion 506 outputs the calculated correction value to the filter coefficient calculating portion 404. The filter coefficient calculating portion 404 calculates a filter coefficient to be used for a filter calculation based on the correction value input from the correction value setting portion 506. The correction value setting portion 506 is formed of an addition unit configured to calculate a correction value by Expression (2). The correction value setting portion 506 calculates the positional deviation amount (Zmn) by Expression (2) based on the mirror face information and the beam position information read from the register 401 or 402.

In this embodiment, the filter calculation is performed based on the image data and the positional deviation amounts of a plurality of scanning lines. During image formation, the correction value setting portion 506 calculates a positional deviation amount and a correction value for each scanning line, and the filter coefficient calculating portion 404 calculates a filter coefficient once for every time of scanning during the period of time T1. For example, when the range of the filter calculation is defined as L=1, image data of one upper pixel and one lower pixel with respect to a target scanning line (hereinafter referred to as "target line") is referred to. Then, a positional deviation amount of each scanning line within the range of from one upper pixel to one lower pixel with respect to the target line is calculated, to thereby perform the filter calculation. The positional deviation amount of the scanning line corresponding to the target line is calculated during a period of time immediately before the image formation. Regarding the scanning lines scanned before the target line, the calculation results of the positional deviation amounts calculated previously, which are stored in a storage portion (not shown), are used.

(Correction of Position in Sub-Scanning Direction of Pixel of Input Image)

Figure 9:
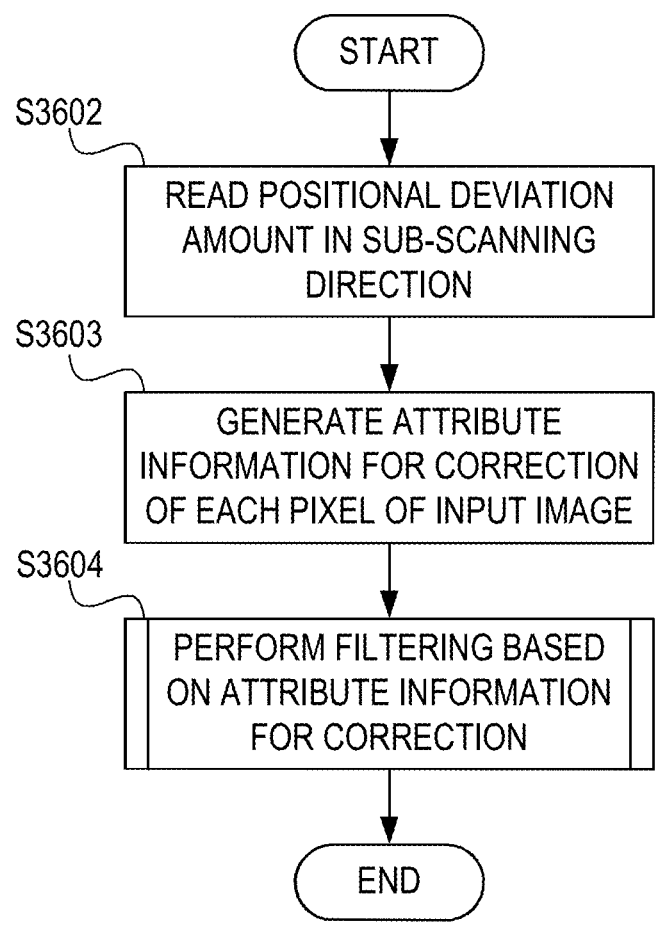
FIG. 9 is a flowchart for illustrating correction processing according to the embodiment.

In this embodiment, the CPU 303 is configured to correct image data based on the positional deviation amounts in the sub-scanning direction of the scanning lines formed by laser beams and output the corrected image data to the laser drive circuit 304. In the following description, the normal mode using all the mirror faces of the rotary polygon mirror 204 is described. The processing of the face skipping control is the same as that of the normal mode except that the information to be used is read from the register 402, and hence the description of the face skipping control is omitted. Now, a flowchart of FIG. 9 is described below. FIG. 9 is a flowchart for illustrating correction processing for correcting uneven image density and banding caused by the positional deviation in the sub-scanning direction. In Step S3602, the CPU 303 reads the positional deviation amount in the sub-scanning direction stored in the register 401. Specifically, the CPU 303 reads the position information X1 to X7 of the scanning lines LD2 to LD8 and the position information Y1 to Y4 of the first to fourth faces of the rotary polygon mirror 204 shown in Table 1 from the register 401. In this embodiment, the pixel position in the sub-scanning direction of the input image data is corrected based on the positional deviation amount in the sub-scanning direction, followed by the filtering, to thereby output pixel data, that is, density.

(State of Positional Deviation of Scanning Line)

The state of positional deviation of a scanning line can be roughly classified into four cases. First, regarding the state of positional deviation, there is a case (a) in which the position of a scanning line (hereinafter referred to as "scanning position") on the photosensitive drum 102 is shifted in an advance direction with respect to an ideal scanning position, and a case (b) in which the scanning position on the photosensitive drum 102 is shifted in a return direction with respect to the ideal scanning position. Further, regarding the state of positional deviation, there is a case (c) in which the scanning positions on the photosensitive drum 102 are dense with respect to the ideal scanning positions, and a case (d) in which the scanning positions on the photosensitive drum 102 are sparse with respect to the ideal scanning positions. Specific examples of the state of positional deviation in the sub-scanning direction are illustrated in FIG. 10A, FIG. 10B, FIG. 10C, and FIG. 10D. In FIG. 10A to FIG. 10D, the broken lines represent scanning positions, and in FIG. 10A to FIG. 10D, scanning numbers (1) to (5) represent the order of scanning. In this embodiment, eight beams are used for scanning simultaneously, but description is given on the assumption that the order is allocated to each beam arranged successively in the sub-scanning direction. Each column on the left side of FIG. 10A to FIG. 10D represents ideal scanning positions, and each column on the right side thereof represents scanning positions on the photosensitive drum 102. S1 to S5 represent positional deviation amounts from the ideal scanning positions with respect to the scanning numbers (1) to (5). The unit of a positional deviation amount is represented based on the case where the ideal beam interval (21.16 µm at 1,200 dpi) is defined as 1, and the advance direction of a laser beam in the sub-scanning direction (hereinafter simply referred to as "advance direction") is set to a positive value. Further, the return direction of the laser beam in the sub-scanning direction (hereinafter simply referred to as "return direction") is set to a negative value. Further, in order to describe the state of an image, each pixel arranged in the sub-scanning direction is represented by a circle on the scanning line. The shading of the circle represents density.

Figure 10A:
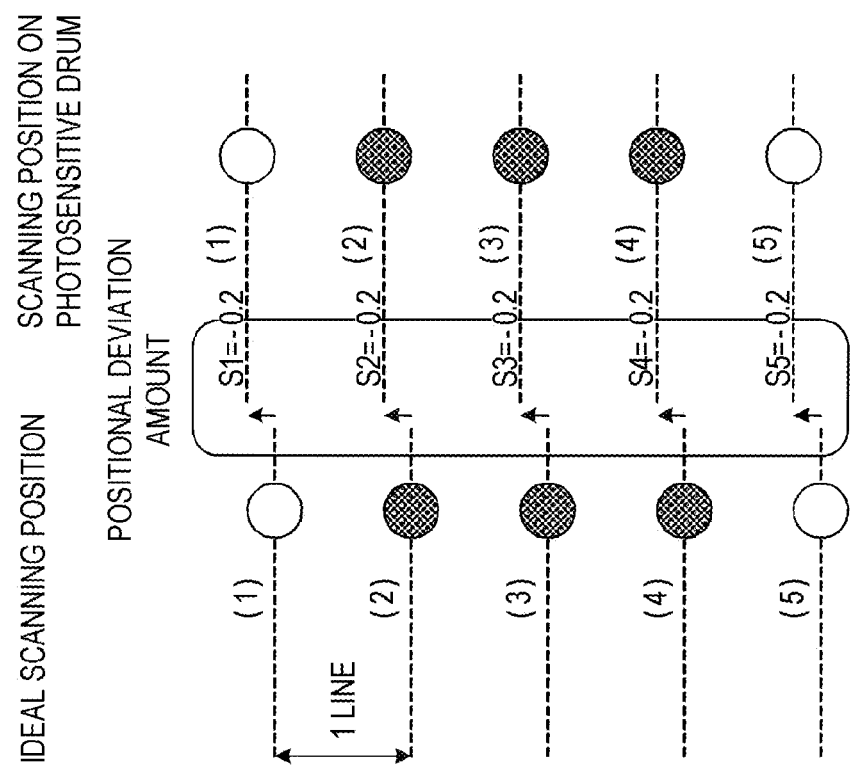
FIG. 10A, FIG. 10B, FIG. 10C, and FIG. 10D are each a diagram for illustrating positional deviation of pixels for each classification according to the embodiment.
Figure 10B:
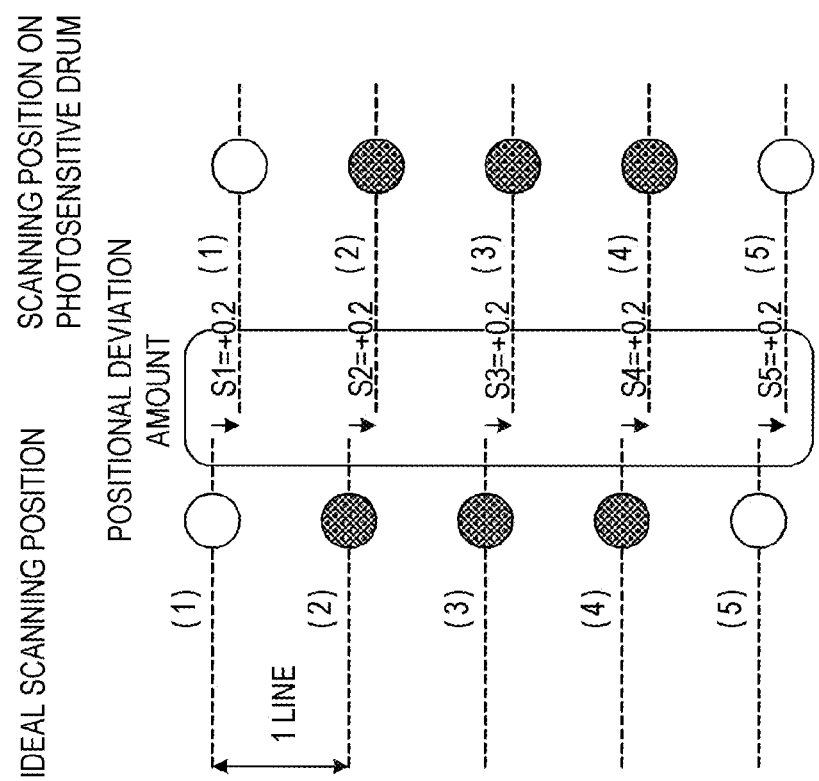

FIG. 10A is an illustration of an example in which the scanning positions on the photosensitive drum 102 are shifted by 0.2 uniformly in the advance direction from the ideal scanning positions. The positional deviation amount as illustrated in FIG. 10A is hereinafter referred to as a shift amount of +0.2. FIG. 10B is an illustration of an example in which the scanning positions on the photosensitive drum 102 are shifted by 0.2 uniformly in the return direction from the ideal scanning positions. The positional deviation amount as illustrated in FIG. 10B is hereinafter referred to as a shift amount of −0.2. In FIG. 10A and FIG. 10B, the scanning positions are shifted uniformly, and hence the interval between the scanning positions on the photosensitive drum 102 is 1 in both the cases.

Figure 10C:
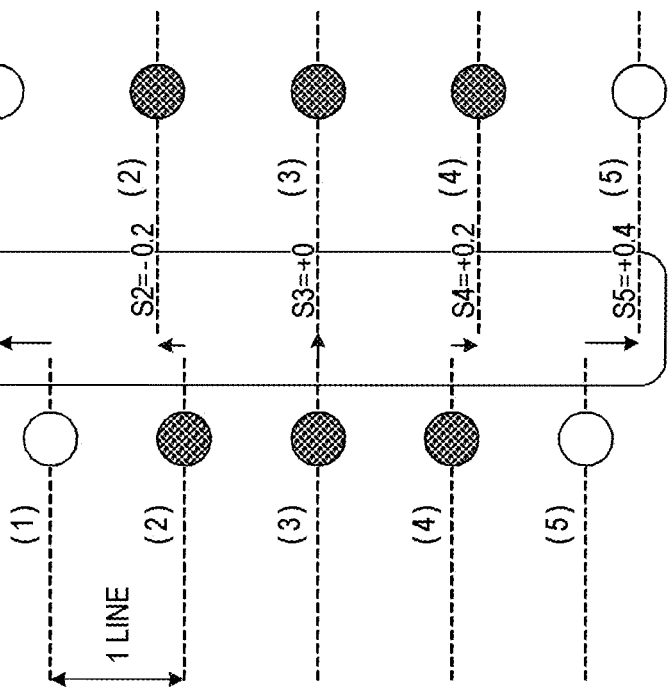

In FIG. 10C, the positional deviation amount is 0 at a predetermined scanning position on the photosensitive drum 102. However, as the scanning position returns backward from the scanning position of the positional deviation amount of 0, the positional deviation amount in the advance direction increases, and as the scanning position proceeds forward from the scanning position of the positional deviation amount of 0, the positional deviation amount in the return direction increases. For example, S3 is +0 in the scanning number (3), but S2 is +0.2 in the scanning number (2), S1 is +0.4 in the scanning number (1), S4 is −0.2 in the scanning number (4), and S5 is −0.4 in the scanning number (5). In FIG. 10C, the interval between the scanning positions is 0.8, which is smaller than 1. The state of positional deviation as illustrated in FIG. 10C is hereinafter referred to as being dense at an interval of a (1-0.2) line.

Figure 10D:
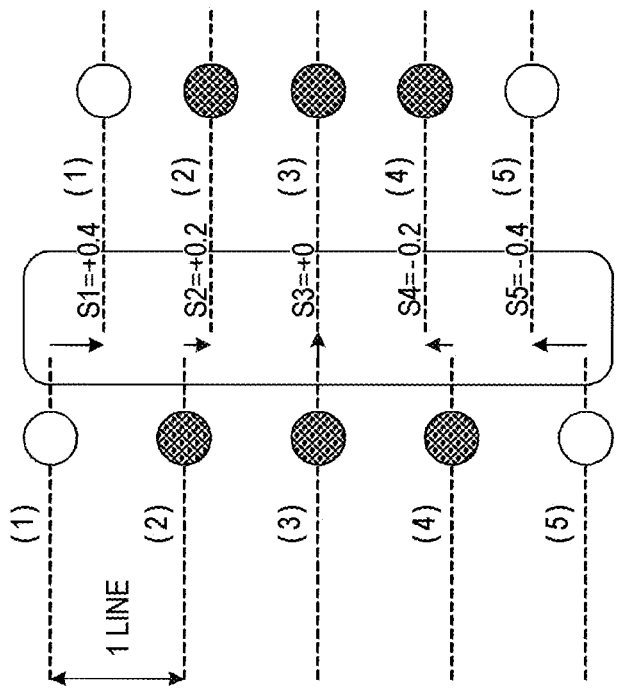

In FIG. 10D, the positional deviation amount is 0 at a predetermined scanning position on the photosensitive drum 102. However, as the scanning position returns backward from the scanning position of the positional deviation amount of 0, the positional deviation amount in the return direction increases, and as the scanning position proceeds forward from the scanning position of the positional deviation amount of 0, the positional deviation amount in the advance direction increases. For example, S3 is +0 in the scanning number (3), but S2 is −0.2 in the scanning number (2), S1 is −0.4 in the scanning number (1), S4 is +0.2 in the scanning number (4), and S5 is +0.4 in the scanning number (5). In FIG. 10D, the interval between the scanning positions is 1.2, which is larger than 1. The state of positional deviation as illustrated in FIG. 10D is hereinafter referred to as being sparse at an interval of a (1+0.2) line.

In the dense state as illustrated in FIG. 10C, positional deviation occurs, and in addition, the scanning positions are dense to cause pixels to be arranged densely on the photosensitive drum 102, with the result that a pixel value per predetermined area increases, to thereby increase density. In contrast, in the sparse state as illustrated in FIG. 10D, positional deviation occurs, and in addition, the scanning positions are sparse to cause pixels to be arranged sparsely on the photosensitive drum 102, with the result that a pixel value per predetermined area decreases, to thereby decrease density. In an electrophotographic process, a shading difference may be further emphasized due to a relationship between the depth of a latent image potential and development characteristics. When the dense or sparse state occurs alternately as illustrated in FIG. 10C and FIG. 10D, periodic shading causes moire, which is liable to be detected visually even at the same amount depending on a space frequency.

Referring back to the flowchart of FIG. 9, in Step S3603, the CPU 303 generates attribute information for correction of each pixel of an input image with the correction value setting portion 506. In this embodiment, the pixel position in the sub-scanning direction of an input image is subjected to coordinate transformation in advance and interpolated, thereby enabling correction of positional deviation and correction of local shading simultaneously while maintaining density of the input image. The attribute information for correction specifically refers to a correction value C described later.

(Coordinate Transformation)

A method for coordinate transformation according to this embodiment is described with reference to FIG. 11A, FIG. 11B, FIG. 13A, and FIG. 13B. In each graph of FIG. 11A, FIG. 11B, FIG. 13A, and FIG. 13B, a horizontal axis represents a pixel number n, and a vertical axis represents a pixel position (which is also a scanning position) y (y' after the coordinate transformation) in the sub-scanning direction, with the unit being a line. Further, FIG. 11A, FIG. 11B, FIG. 13A, and FIG. 13B correspond to FIG. 10A, FIG. 10B, FIG. 10C, and FIG. 10D, respectively. Each graph on the left side of FIG. 11A, FIG. 11B, FIG. 13A, and FIG. 13B represents the state before the coordinate transformation, and each graph on the right side thereof represents the state after the coordinate transformation for the y-axis. Square dots plotted in each graph represent scanning positions on the photosensitive drum 102, and circular dots therein represent ideal scanning positions.

(Cases of being Shifted in Advance Direction and Return Direction)

Figure 11A:
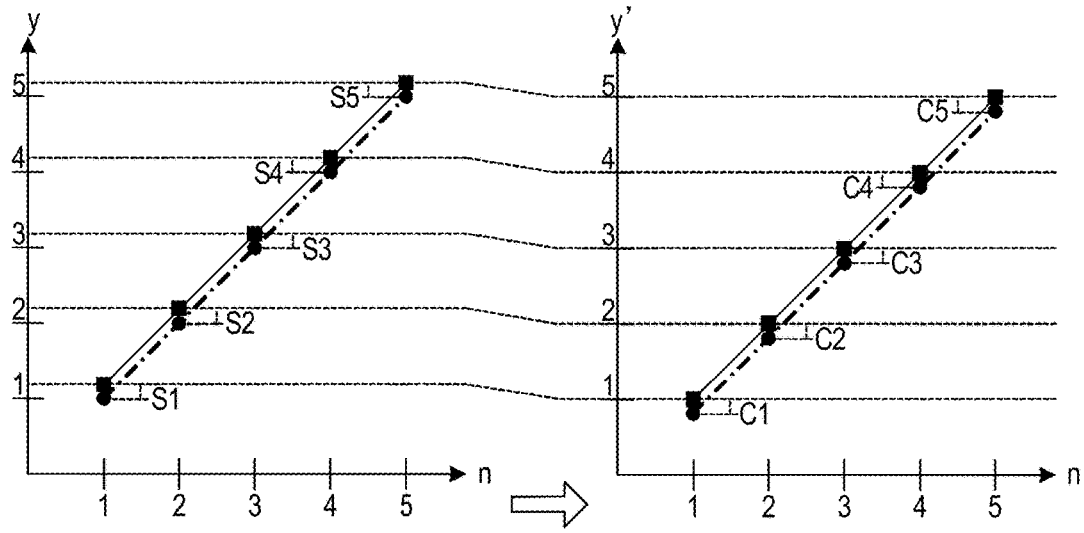
FIG. 11A and FIG. 11B are each a graph for showing coordinate transformation of pixel positions in a sub-scanning direction according to the embodiment.

The graph on the left side of FIG. 11A is first described. In the graph before the coordinate transformation, at the ideal scanning positions plotted with the circular dots, for example, a pixel position y in the sub-scanning direction is 2 with respect to the pixel number 2. Thus, the y-coordinate of the pixel position y is equal to that of the pixel number n, and the ideal scanning positions are represented by a straight line (indicated by the alternate long and short dash line) with a gradient of 1. The straight line of the alternate long and short dash line is represented by Expression (3).

$$y=n \qquad \text{Expression (3)}$$

As illustrated in FIG. 10A, the scanning positions plotted with the square dots are shifted by S (=0.2) line in the advance direction (+ direction of y-axis) with respect to the ideal scanning positions plotted with the circular dots. Therefore, the scanning positions plotted with the square dots are represented by a straight line (indicated by the solid line) offset with the gradient being 1, which is represented by Expression (4).

$$y=n+S \qquad \text{Expression (4)}$$

In this embodiment, the coordinate transformation is performed so that the actual scanning positions are transformed into the ideal scanning positions. Therefore, in the example illustrated in FIG. 11A, it is only necessary that the coordinate transformation be performed through use of Expression (5). In Expression (5), C represents a correction amount.

$$y'=y+C \qquad \text{Expression (5)}$$

Thus, the correction amount C is represented by a shift amount S and Expression (6).

$$C=-S \qquad \text{Expression (6)}$$

Through Expression (5) of the coordinate transformation and Expression (6) for determining the correction amount C, Expressions (3) and (4) are converted as represented by Expressions (7) and (8), respectively.

$$y'=y+C=n+(-S)=n-S \qquad \text{Expression (7)}$$

$$y'=y+C=(n+S)+C=(n+S)+(-S)=n \qquad \text{Expression (8)}$$

Figure 11B:
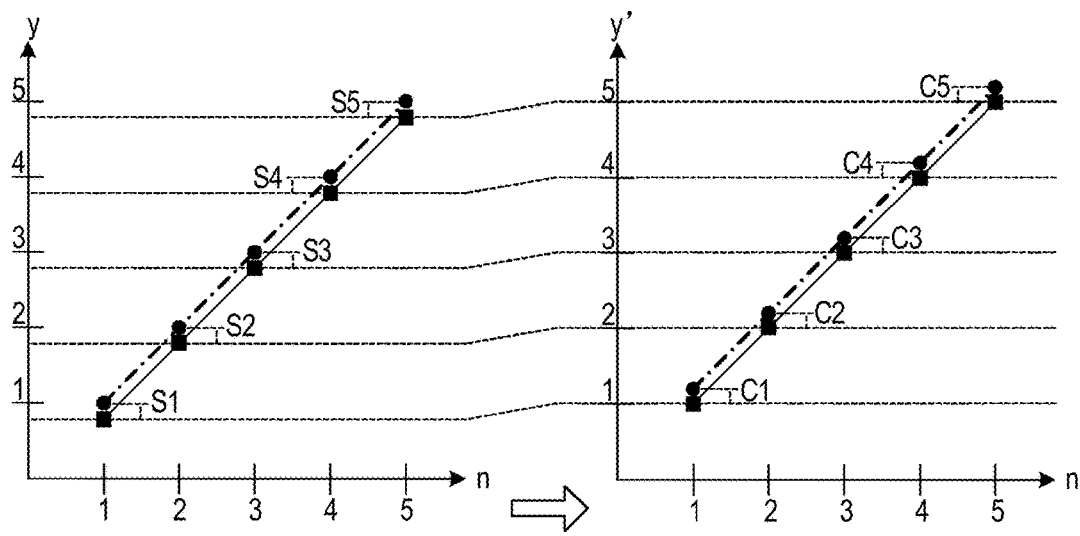

In FIG. 11B, when the shift amount S is defined as −0.2, Expression (8) similarly holds from Expression (3), and the similar description to that of FIG. 11A can be given. As illustrated in FIG. 11A and FIG. 11B, when the scanning lines are not sparse or dense, and are shifted in the advance direction or the return direction, a straight line has a predetermined gradient before and after the coordinate transformation.

(Case in which Dense or Sparse State Occurs)

Figure 13A:
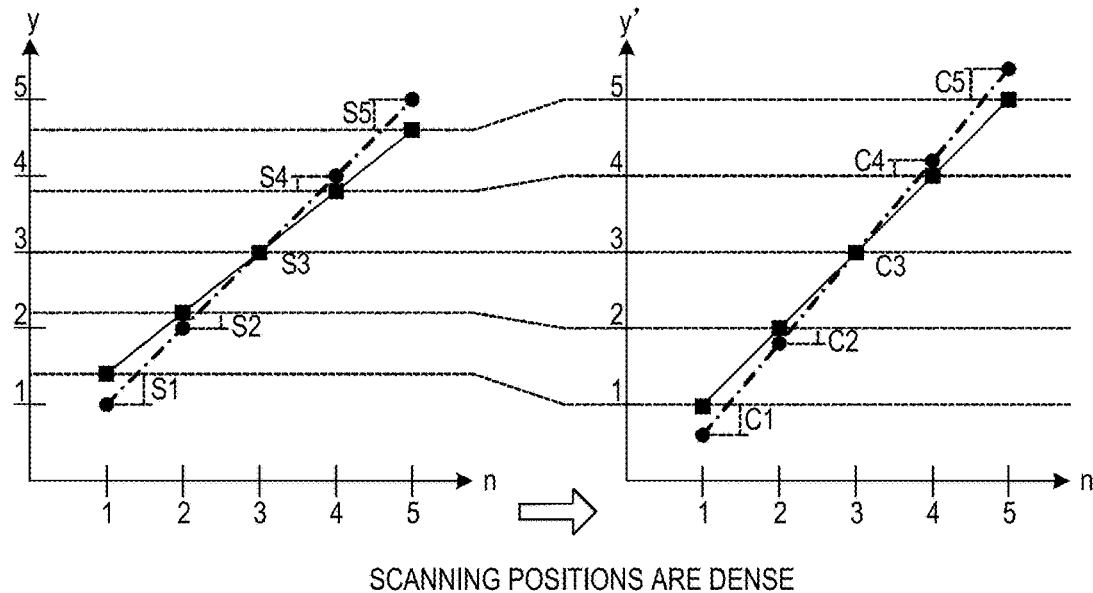
FIG. 13A and FIG. 13B are each a graph for showing coordinate transformation of pixel positions in the sub-scanning direction according to the embodiment.
Figure 13B:
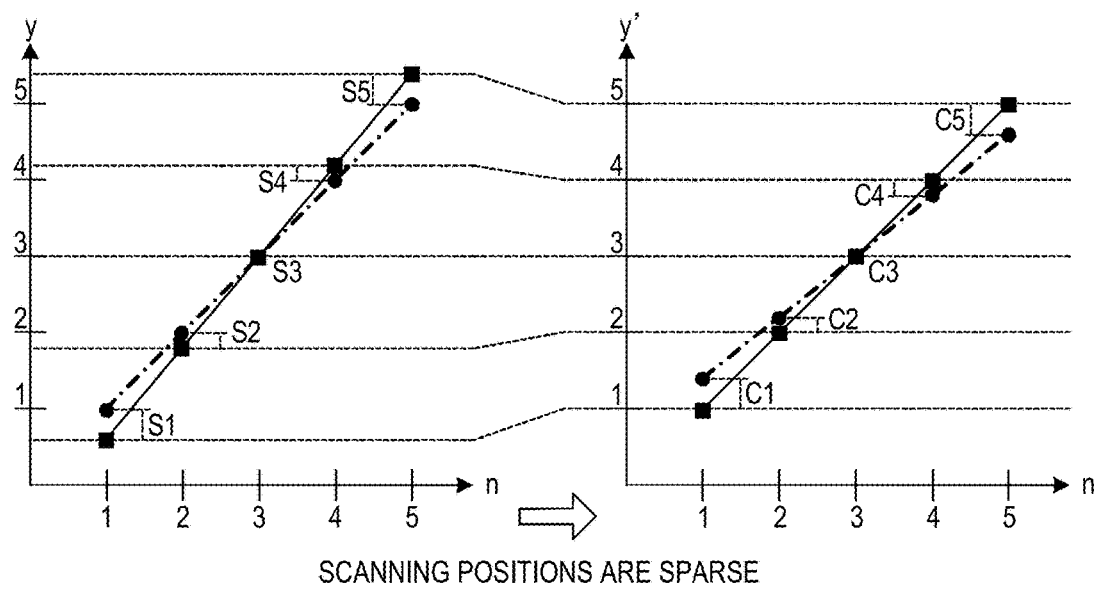

Now, the coordinate transformation is described, which is also applicable to the cases in FIG. 13A and FIG. 13B in which the scanning positions become dense or sparse, and the cases of combinations of FIG. 11A, FIG. 11B, FIG. 13A, and FIG. 13B in which a shift and a dense or sparse state occur. FIG. 12A is an illustration of a relationship between the pixel number and the scanning position, and a horizontal axis represents a pixel number n, and a vertical axis y represents a scanning position in the sub-scanning direction, square dots being plotted as the scanning positions on the photosensitive drum 102. In FIG. 12A, the case is described in which the scanning lines are dense on the photosensitive drum 102 within a range of the pixel number of n≤2, and the scanning lines are sparse on the photosensitive drum 102 within a range of the pixel number of n≥2.

As illustrated in FIG. 12A, when the scanning lines are dense within the range of the pixel number of n≤2, and are sparse within the range of the pixel number of n≥2, the gradient of a straight line within the range of the pixel number of n≤2 is different from that of a straight line within the range of the pixel number of n≥2, and the lines have a curved shape at the pixel number of n=2. In FIG. 12A, a function indicating a change in scanning positions passing through the square dots is defined as ft(n) and is represented by the solid line. The function ft(n) representing the scanning positions is represented by Expression (9).

$$y=ft(n) \qquad \text{Expression (9)}$$

Next, when a function after the coordinate transformation of the y-axis that represents the scanning positions in the sub-scanning direction is defined as ft'(n), the function ft'(n) representing the scanning positions after the coordinate transformation is represented by Expression (10).

$$y'=ft'(n) \qquad \text{Expression (10)}$$

In this embodiment, the coordinate transformation is performed by expanding or contracting the y-axis or shifting the y-axis so that the scanning positions after the coordinate transformation become uniform. Therefore, the function ft'(n) representing the scanning positions after the coordinate transformation satisfies the condition represented by Expression (11).

$$ft'(n)=n \qquad \text{Expression (11)}$$

Expression (11) means that, for example, a pixel position y' (=ft'(2)) in the sub-scanning direction after the coordinate transformation becomes 2 with respect to the pixel number 2.

The broken lines connecting FIG. 12A and FIG. 12B to each other represent the correspondence from an original coordinate position of the y-axis to a coordinate position of the y'-axis after the coordinate transformation from the left to the right, and indicate a state in which a lower half (corresponding to n≤2) of the y-axis expands, and an upper half (corresponding to n≥2) contracts before and after the coordinate transformation. A procedure for determining a coordinate after the coordinate transformation of each pixel of input image data through the coordinate transformation of FIG. 12A and FIG. 12B is described with reference to FIG. 12C and FIG. 12D. In the same manner as in FIG. 12A and FIG. 12B, a horizontal axis in FIG. 12C and FIG. 12D represents a pixel number n, and a vertical axis y (or y') represents scanning positions in the sub-scanning direction. FIG. 12C is an illustration before the coordinate transformation, and FIG. 12D is an illustration after the coordinate transformation. A relationship between the pixel number n and the coordinate position y of the input image data is described below. The broken line of FIG. 12C represents a function fs(n) representing ideal scanning positions before the coordinate transformation and is represented by Expression (12).

$$y=fs(n) \qquad \text{Expression (12)}$$

In this embodiment, the interval between the pixels in the sub-scanning direction of the input image data is uniform, and hence the function fs(n) is represented by Expression (13).

$$fs(n)=n \qquad \text{Expression (13)}$$

A scanning position of the y'-coordinate after the coordinate transformation of a target pixel number ns of the input image data is determined through three steps described below. In the first step, when the y-coordinate of an ideal scanning position corresponding to the pixel number ns of the input image data is defined as ys, ys can be determined by Expression (14).

$$ys=fs(ns) \qquad \text{Expression (14)}$$

A pixel number nt in which the scanning position before the coordinate transformation is the same on the photosensitive drum 102 (solid line) is determined ((1) of FIG. 12C). The scanning position on the photosensitive drum 102 is represented by the function y=ft(n), and a relationship of ys=ft(nt) holds. When an inverse function of the function ft(n) is defined as ft$^{-1}$(y), the pixel number nt is represented by Expression (15).

$$nt=ft^{-1}(ys) \qquad \text{Expression (15)}$$

In the second step, the y'-coordinate after the coordinate transformation (defined as yt) corresponding to the pixel number nt of the scanning position on the photosensitive drum 102 is determined by Expression (16) through use of the function ft'(n) after the coordinate transformation ((2) of FIG. 12D).

$$yt=ft'(nt) \qquad \text{Expression (16)}$$

The pixel number ns holds even when any number is selected, and hence an expression for determining the position yt of the y'-coordinate after the coordinate transformation based on the pixel number ns corresponds to the function fs'(n) for determining the y'-coordinate in calculation based on the pixel number n of the input image data.

Thus, a general expression represented by Expression (17) is derived from Expressions (14) to (16). A function indicating the ideal scanning position represented by the broken line after the coordinate transformation is represented by y'=fs'(n) ((3) of FIG. 12D).

$$yt=fs'(ns)=ft'(nt)=ft'(ft^{-1}(ys))=ft'(ft^{-1}(fs(ns)))$$

ns is generalized into n to obtain Expression (17).

$$fs'(n)=ft'(ft^{-1}(fs(n))) \qquad \text{Expression (17)}$$

Expression (13) and Expression (11) in which the pixel interval of the input image data and the interval of the scanning positions after the coordinate transformation are set to be uniform, with the distance of 1, are substituted into Expression (17). Then, Expression (17) is represented by Expression (18) through use of the inverse function ft$^{-1}$(n) of the function ft(n) for deriving the scanning position from the pixel number n.

$$fs'(n)=ft^{-1}(n) \qquad \text{Expression (18)}$$

Expression (4) in which the scanning positions are shifted uniformly in the advance direction and the return direction as illustrated in FIG. 11A and FIG. 11B, and Expression (7) for determining a position after the coordinate transformation of the input image data also have an inverse function relationship, and it can be confirmed that Expression (18) holds. When applied to the case in which the dense or sparse state occurs in scanning positions as illustrated in FIG. 13A and FIG. 13B, the function y representing scanning positions before the coordinate transformation is represented by Expression (19) when the function y is a straight line with a gradient k, passing through (n0, y0).

$$fs(n)=y=k \times (n-n0)+y0 \qquad \text{Expression (19)}$$

In order to determine a pixel position after the coordinate transformation of the y-axis of the input image data, it is only necessary that an inverse function ((1/k)×(y−y0)+n0) be determined by Expressions (17) and (18), and the pixel number n be substituted into the inverse function, and hence Expression (20) is derived.

$$y'=(1/k) \times (n-y0)+n0 \qquad \text{Expression (20)}$$

When the scanning lines illustrated in FIG. 13A are dense, and the scanning lines illustrated in FIG. 13B are sparse, the positions of the scanning lines on the photosensitive drum 102 after the coordinate transformation can be represented by Expression (20) in both the cases. A correction value Cn of the pixel number n is determined by Cn=fs'(n)−fs(n).

Specifically in FIG. 13A, n0=y0=3 and k=0.8 are satisfied, and Expression (21) is obtained.

$$fs'(n)=(1/0.8) \times (n-3)+3 \qquad \text{Expression (21)}$$

For example, in the pixel number 3, fs'(3)=3.00 is satisfied, and the correction value C3 is 0.00 (=3.00−3.00). In the pixel number 5, fs'(5)=5.50 is satisfied, and the correction value C5 is +0.50 (=+5.50-5.00). The correction values C1 to C5 when the scanning positions are dense are illustrated in FIG. 16C.

In FIG. 13B, n0=y0=3, and k=1.2 are satisfied, and Expression (22) is obtained.

$$fs'(n)=(1/1.2) \times (n-3)+3 \qquad \text{Expression (22)}$$

For example, in the pixel number 3, fs'(3)=3.000 is satisfied, and the correction value C3 is 0.000 (=3.000−3.000). In the pixel number 5, fs'(5)=4.667 is satisfied, and the correction value C5 is −0.333 (=4.667−5.000). The correction values C1 to C5 when the scanning positions are sparse are illustrated in FIG. 16D.

Even when a dense or sparse state and a shift are mixed in the scanning lines, an ideal scanning position after the coordinate transformation can be determined through use of Expression (17) or (18). The correction value setting portion 506 is configured to subject an ideal scanning position to the coordinate transformation based on a positional deviation amount to determine the correction value Cn, and output information on the correction value Cn to the filter coefficient calculating portion 404.

(Filtering)

In this embodiment, the filtering is performed in order to generate correction data. In this embodiment, the filter calculation portion 405 is configured to perform the filtering through a convolution calculation based on the following filter function. That is, the filter calculation portion 405 performs the filtering based on a positional relationship between the pixel positions in the sub-scanning direction of pixels obtained by correcting scanning positions in the sub-scanning direction of pixels of the input image data, and the sub-scanning positions of pixels having an interval between scanning lines transformed uniformly by the coordinate transformation. A pixel before the filtering is also referred to as an input pixel, and a pixel after the filtering is also referred to as an output pixel. Further, a pixel before the filtering is a pixel subjected to the above-mentioned coordinate transformation.

Figure 14A:
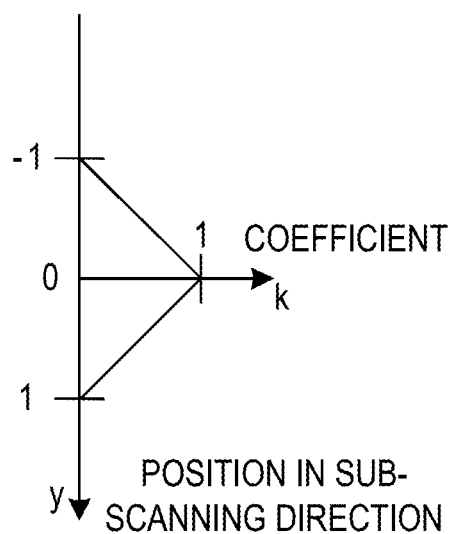
FIG. 14A is a graph for showing a convolution function to be used in filtering according to the embodiment.
Figure 14B:
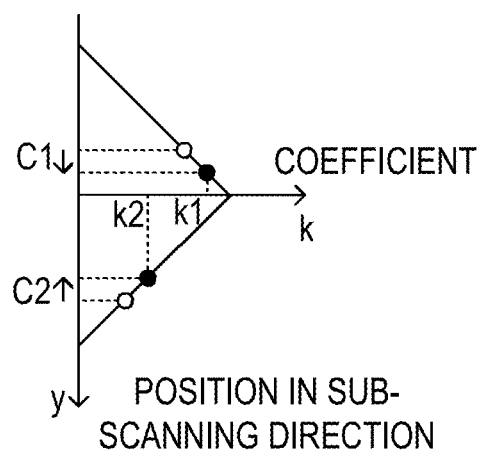
FIG. 14B is a graph for showing a correction value and a coefficient.

The convolution function according to this embodiment is linear interpolation illustrated in FIG. 14A. The filter function output portion 505 outputs information on the convolution function used in the filtering to the filter coefficient calculating portion 404 as information of a table, for example. In FIG. 14A and FIG. 14B, a vertical axis y represents a position in the sub-scanning direction, with a unit being a pixel, and a horizontal axis k represents a magnitude of a coefficient. Although the unit of the vertical axis y is set to a pixel, a line may be used as a unit because the sub-scanning direction is illustrated.

The filtering is described with reference to FIG. 14B. In FIG. 14B, a horizontal axis represents a coefficient k to be used in the filtering, and a vertical axis represents a position y in the sub-scanning direction. When the filter coefficient calculating portion 404 receives the correction value Cn from the correction value setting portion 506, the filter coefficient calculating portion 404 determines a coefficient kn corresponding to the correction value Cn through use of the filter function input from the filter function output portion 505. White circles of FIG. 14B represent coefficients before the coordinate transformation. Black circles of FIG. 14B represent that coefficients k1 and k2 were set with respect to a correction value C1 and a correction value C2, respectively, as coefficients kn to be used in the filtering. In this embodiment, the same convolution function is applied irrespective of whether the input image data is dense or sparse, and sampling is performed at an ideal scanning position, to thereby store density per predetermined area of the input image data.

A filter coefficient for a pixel on one upper scanning line with respect to a target pixel on a target line (hereinafter referred to as "target pixel") is represented by Expression (23). A variable y in Expression (23) represents a positional deviation amount of one upper scanning line of the target pixel stored in the registers 401 and 402.

$$\begin{cases} k1 = (y-1) + 1(-1 \le y \le 0) \\ k1 = -(y-1) + 1(0 < y \le 1) \\ 0(y < -1, y > 1) \end{cases} \quad \text{Expression (23)}$$

A filter coefficient for the target pixel is represented by Expression (24). A variable y in Expression (24) represents a positional deviation amount of a scanning line of the target pixel stored in the registers 401 and 402.

$$\begin{cases} k2 = y + 1(-1 \le y \le 0) \\ k2 = -y + 1(0 < y \le 1) \\ 0(y < -1, y > 1) \end{cases} \quad \text{Expression (24)}$$

A filter coefficient for a pixel on one lower scanning line with respect to the target pixel is represented by Expression (25). A variable y in Expression (25) represents a positional deviation amount of one lower scanning line with respect to the target pixel stored in the registers 401 and 402.

$$\begin{cases} k3 = (y+1) + 1(-1 \le y \le 0) \\ k3 = -(y+1) + 1(0 < y \le 1) \\ 0(y < -1, y > 1) \end{cases} \quad \text{Expression (25)}$$

In this embodiment, when a correction value for the target pixel is calculated, a predetermined scanning line including the target pixel and a scanning line group included within a predetermined range from the predetermined scanning line in the advance direction and the return direction in the sub-scanning direction are used for the calculation.

<Method of Filter Calculation>

FIG. 15 is an illustration of the details of the filter calculation portion 405. As described with reference to FIG. 2, the filter calculation portion 405 receives the image data and the filter coefficient from the filter coefficient calculating portion 404. The filter calculation portion 405 performs a convolution calculation (filtering) based on the input image data and the filter coefficient. Further, the filter calculation portion 405 outputs the calculated results to the laser drive circuit 304 through the error diffusion processing portion 502 and the PWM signal generating portion 503. The filter calculation portion 405 includes FIFO memories 3001, 3002, and 3003, multipliers M0, M1, and M2, and an adder A0.

When the image formation is started, the filter calculation portion 405 receives the filter coefficient and the image data. The FIFO memory 3002 successively stores the image data corresponding to one scanning line of the target line. The FIFO memory 3001 successively stores the image data corresponding to one scanning line of one upper scanning line with respect to the target line, and the FIFO memory 3003 successively stores the image data corresponding to one scanning line of one lower scanning line with respect to the target line.

The image data of one upper scanning line with respect to the target line stored in the FIFO memory 3001 and the filter coefficient k1 represented by Expression (23) are input to the multiplier M0, and the multiplied results are output to the adder A0. The image data of the target line stored in the FIFO memory 3002 and the filter coefficient k2 represented by Expression (24) are input to the multiplier M1, and the multiplied results are output to the adder A0. The image data of one lower scanning line with respect to the target line stored in the FIFO memory 3003 and the filter coefficient k3 represented by Expression (25) are input to the multiplier M2, and the multiplied results are output to the adder A0. The adder A0 adds up the values input from the multipliers M0 to M2 and outputs the results. The filter coefficient calculating portion 404 outputs the coefficient k to be used for the filtering to the filter calculation portion 405 based on the information on the filter function obtained from the filter function output portion 505 and the information on the correction value C output from the correction value setting portion 506.

(Specific Example of Filtering)

A specific example of performing the filtering through use of the convolution calculation with a filter function by linear interpolation of Expressions (23) to (25) based on a coordinate position after the coordinate transformation of this embodiment is described with reference to FIG. 16A, FIG. 16B, FIG. 16C, and FIG. 16D. The filtering using the convolution calculation is performed by the filter calculation portion 405. FIG. 16A to FIG. 16D correspond to FIG. 10A to FIG. 10D. Each column on the left side of FIG. 16A to FIG. 16D represents input pixels after the coordinate transformation. Each column on the right side of FIG. 16A to FIG. 16D represents scanning positions on the photosensitive drum 102 after the coordinate transformation. That is, the scanning positions in each column on the right side of FIG. 16A to FIG. 16D have been subjected to the coordinate transformation so as to have a uniform interval and a distance of 1.

More specifically, the scanning positions in the sub-scanning direction of input pixels after the coordinate transformation are represented by a straight line (y'=fs'(n)) indicated by the alternate long and short dash line of the graph after the coordinate transformation illustrated on the right side of FIG. 11A, FIG. 11B, FIG. 13A, and FIG. 13B. The scanning positions on the photosensitive drum 102 after the coordinate transformation are represented by a straight line (y'=fs'(n)) indicated by the solid line of the graph after the coordinate transformation illustrated on the right side of FIG. 11A, FIG. 11B, FIG. 13A, and FIG. 13B. For example, in FIG. 11A, the shift amount is +0.2 (=S), and hence fs'(n)=y−0.2=n−0.2 is satisfied after the coordinate transformation.

In FIG. 16A to FIG. 16D, the magnitude of a pixel value, that is, a density value is represented by shading of circles. Numbers in parentheses indicate numbers of scanning lines, and are the same as the pixel numbers illustrated in FIG. 10A to FIG. 10D. In each graph at the center of FIG. 16A to FIG. 16D, a horizontal axis represents density, and a vertical axis represents a position in the sub-scanning direction. The convolution calculation involves developing waveforms W (waveforms W1 to W5 with respect to the pixels (1) to (5)) obtained by multiplying the filter function based on each coordinate position of an input image (FIG. 14A) by a pixel value, and adding the waveforms W by superimposing.

Figure 16A:
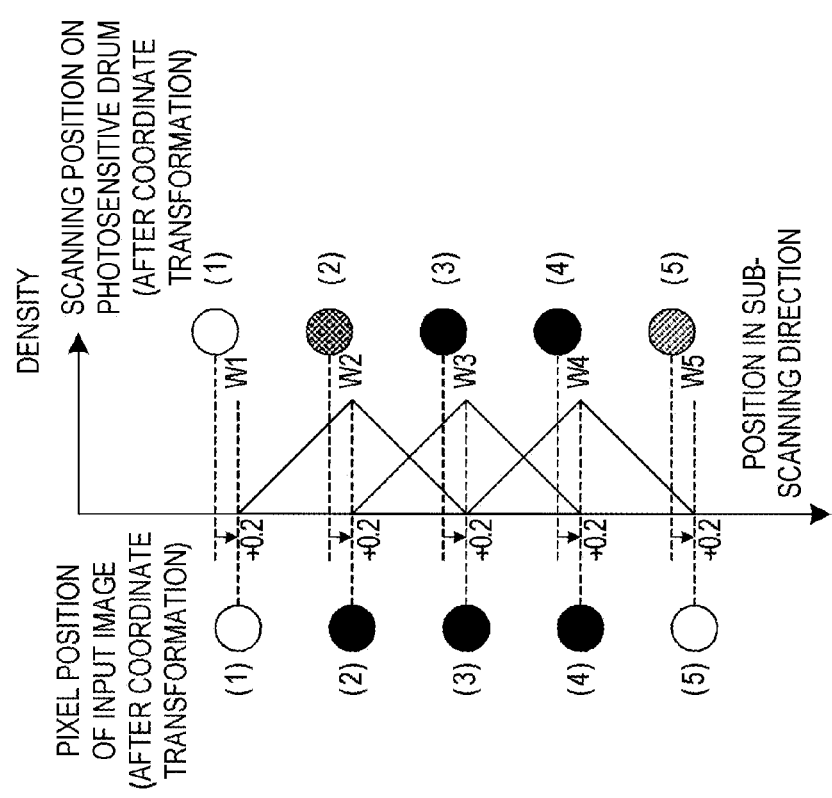
FIG. 16A, FIG. 16B, FIG. 16C, and FIG. 16D are each a diagram for illustrating filtering for each classification of positional deviation according to the embodiment.

FIG. 16A is described first. The pixels (1) and (5) represented by white circles have a density of 0, that is, a pixel value of 0. Therefore, the waveform W1 and the waveform W5 obtained by multiplying a filter function by a pixel value are both 0. The pixels (2), (3), and (4) represented by black circles have the same density, and the maximum values of the waveforms W2, W3, and W4 are the same. Thus, the pixels (2), (3), and (4) each result in a waveform obtained by developing the filter function based on the pixel position of the input pixel. The result of the convolution calculation is a sum (ΣWn, n=1 to 5) of all the waveforms.

Figure 16B:
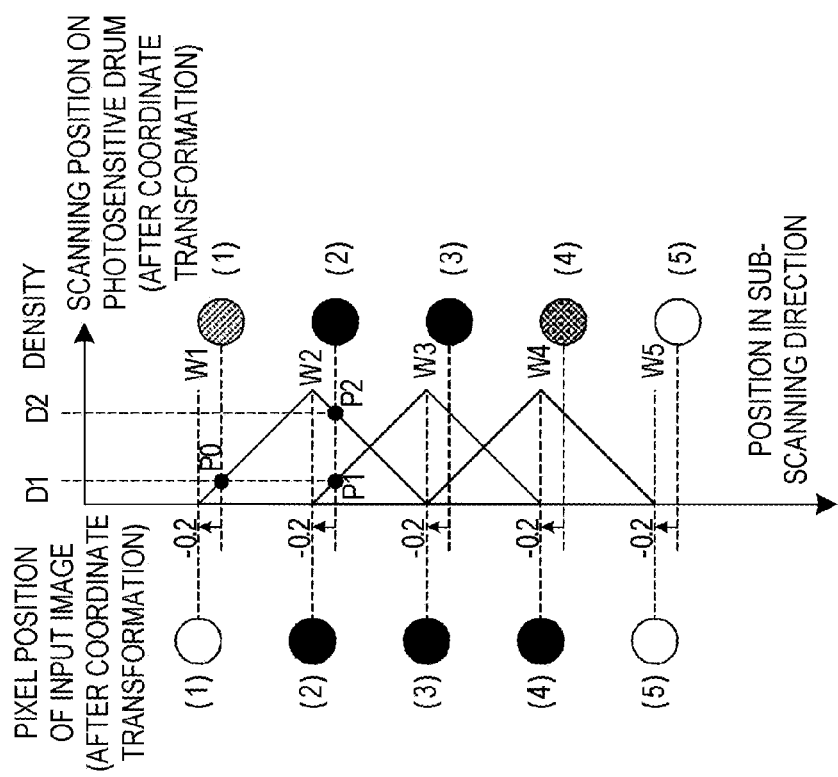
Figure 16D:
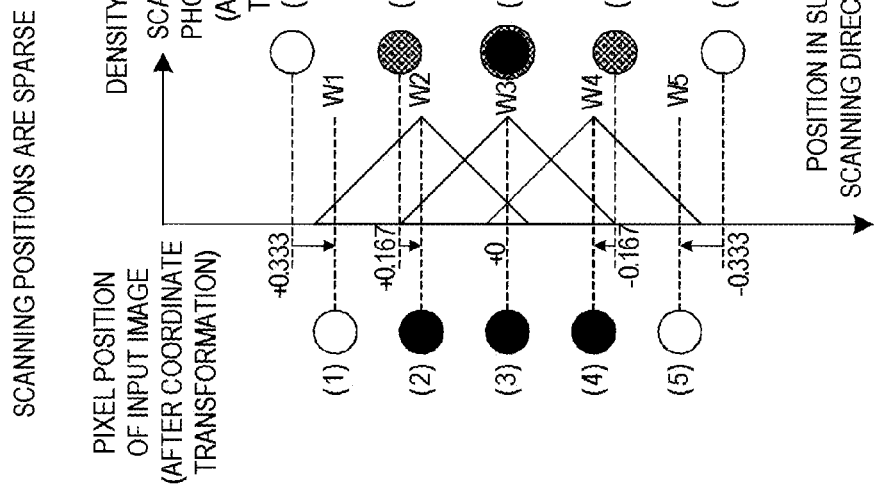
Figure 16C:
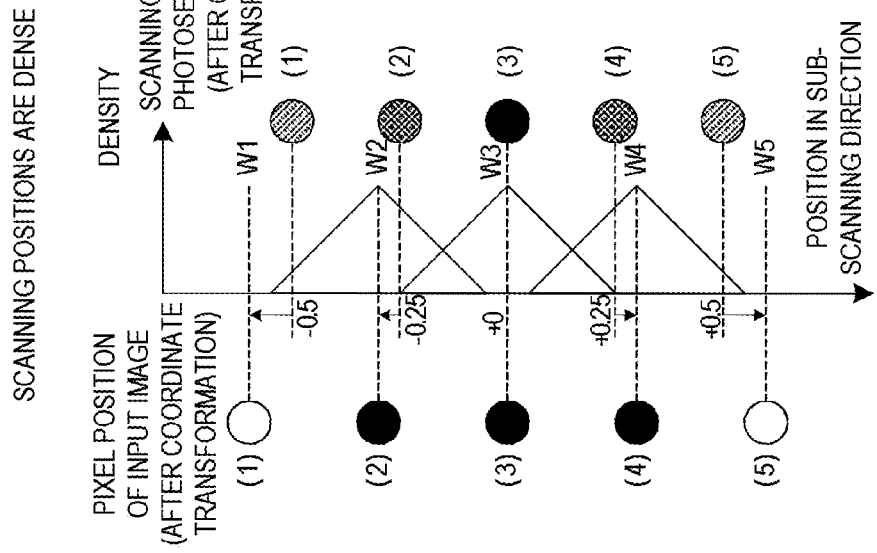

A pixel value of an output pixel is sampled at the scanning position on the photosensitive drum 102 after the scanning position is subjected to the coordinate transformation. Therefore, for example, the pixel value (1) corresponding to the scanning position on the photosensitive drum 102 intersects with the waveform W2 at a point P0, and hence is calculated to be density D1. The pixel value (2) intersects with the waveform W2 at a point P2 and the waveform W3 at a point P1, respectively, and hence is calculated to be density D1+D2. The pixel values (3) to (5) are subsequently determined in a similar manner. The pixel value (5) does not intersect with any waveform, and hence the pixel value thereof is set to 0. Further, the results obtained by calculating the pixel values (1) to (5) of FIG. 16B to FIG. 16D are represented by shading of pixels in each column on the right side.

The positional deviation of the input pixels is illustrated so as to correspond to each pixel in the vertical axis of FIG. 16A to FIG. 16D. The positional deviation amount represented by the vertical axis of FIG. 16A to FIG. 16D is information on the positional deviation amount determined by an inverse function in accordance with the coordinate transformation of the scanning positions in the sub-scanning direction of the pixels of the input image. For example, in the case of FIG. 16A, as described with reference to FIG. 11A, the correction amount C of the positional deviation amount S of the scanning lines is −0.2. Further, for example, in the cases of FIG. 16C and FIG. 16D, the correction amounts C are calculated through use of Expressions (21) and (22), respectively.

FIG. 16A is an illustration of a state in which the scanning positions of the scanning lines are shifted in the advance direction in the sub-scanning direction, but the median points of the pixel values are shifted in the return direction, and hence the positions of the median points of the pixel values are corrected. FIG. 16B is an illustration of a state in which the scanning positions of the scanning lines are shifted in the return direction in the sub-scanning direction, but the median points of the pixel values are shifted in the advance direction, and hence the positions of the median points of the pixel values are corrected. FIG. 16C is the case in which the scanning positions are dense, and is an illustration of a state in which the distribution of density is widened due to the convolution calculation after the coordinate transformation to cancel the local concentration of density, to thereby correct a local change in density. FIG. 16D is the case in which the scanning positions are sparse, and is an illustration of a state in which the distribution of density is narrowed due to the convolution calculation after the coordinate transformation to cancel the dispersion of density, to thereby correct a local change in density. In particular, the pixel value (3) of FIG. 16D is a density of (100+α)% that is higher than 100%.

(Filtering)

Figure 17:
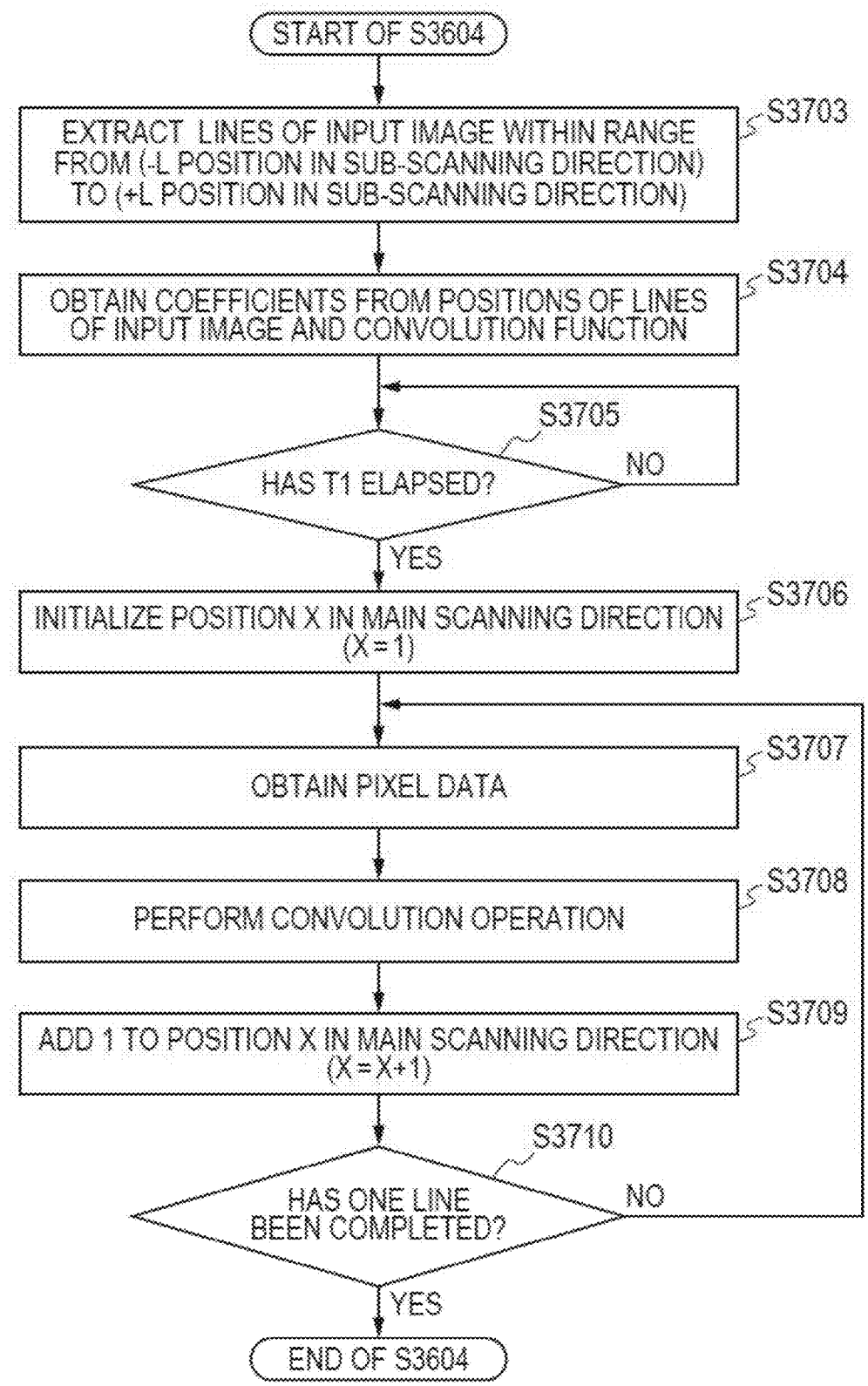
FIG. 17 is a flowchart for illustrating the filtering according to the embodiment.
Figure 18A:
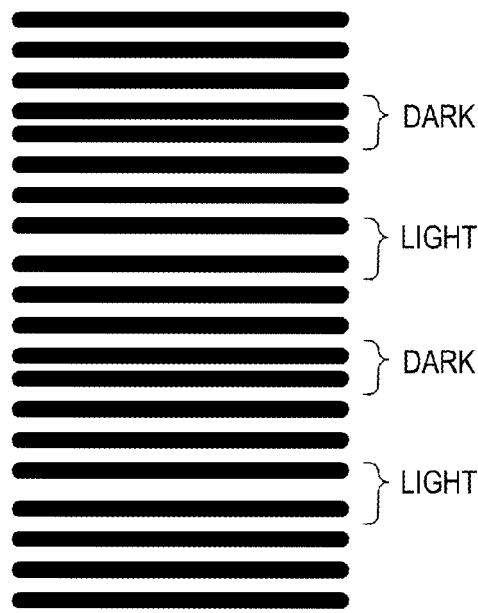
FIG. 18A is a diagram for illustrating uneven image density in the related art.
Figure 18B:
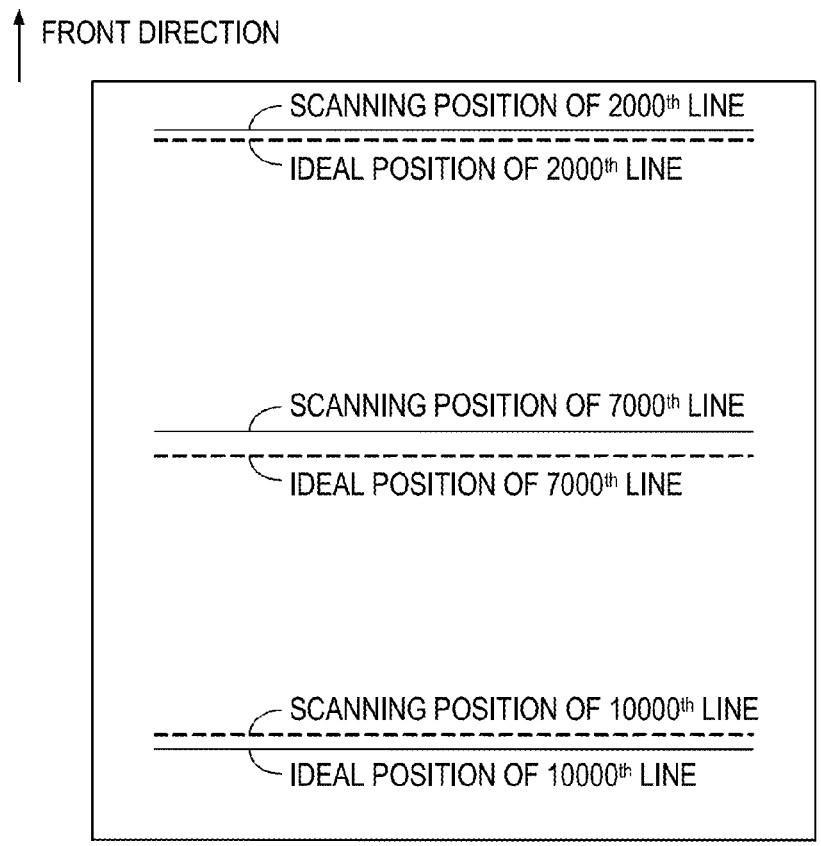
FIG. 18B is a diagram for illustrating positional deviation of scanning lines.

Referring back to FIG. 9, in Step S3604 of FIG. 9, the CPU 303 performs the filtering with the filter calculation portion 405 based on the attribute information for correction generated in Step S3603. Specifically, the CPU 303 performs a convolution calculation and re-sampling with respect to the input image. The processing of Step S3604 performed by the CPU 303 is described below in detail with reference to a flowchart of FIG. 17. When the CPU 303 starts the filtering through the convolution calculation with the filter calculation portion 405, the CPU 303 performs the processing in Step S3703 and subsequent steps. In Step S3703, when the spread of the convolution function is defined as L, the CPU 303 extracts lines of an input image within a range of before and after ±L of the sub-scanning position of a line yn of a target output image, that is, the range of a width of 2L (range of from (ys−L) to (ys+L)). L is defined as a minimum value at which the value of the convolution function becomes 0 outside of the range of from +L to −L of the convolution function. For example, in the linear interpolation of FIG. 14A, L is equal to 1. The ymin and ymax within a range of from ymin to ymax of the corresponding input image satisfy the following condition through use of Expression (18).

$$ft^{-1}(y\text{min})=yn-L, ft^{-1}(y\text{max})=yn+L \quad \text{Expression (26)}$$

When Expression (26) is modified, the ymin and ymax are determined by Expression (27).

$$y\text{min}=ft(yn-L), y\text{max}=ft(yn+L) \quad \text{Expression (27)}$$

Thus, the lines of the input image to be extracted with respect to the line yn of the target output image are lines of all the integers within a range of from ymin to ymax.

When the line of the target output image is denoted by yn, and the line of the input image to be subjected to the convolution calculation is denoted by ym, a distance dnm is represented by Expression (28).

$$dnm=yn-ft^{-1}(ym) \quad \text{Expression (28)}$$

Thus, in Step S3704, the CPU 303 obtains a coefficient knm as a convolution function g(y) with the filter coefficient calculating portion 404 by Expression (29).

$$knm=g(dnm) \quad \text{Expression (29)}$$

In Step S3705, the CPU 303 refers to a built-in timer which has been started when the BD signal has been received, to thereby determine whether or not a period of time T1 has elapsed. The period of time T1 is a period of time from timing at which the BD signal is output to timing at which the laser beam reaches the leading edge of the image area in the main scanning direction of the photosensitive drum 102. In Step S3705, when the CPU 303 determines that the period of time T1 has not elapsed, the CPU 303 returns to the processing in Step S3705. When the CPU 303 determines that the period of time T1 has elapsed, the CPU 303 proceeds to the processing in Step S3706. In Step S3706, the CPU 303 initializes the position x in the main scanning direction (set the position x to 1). In Step S3707, the CPU 303 obtains pixel data on the position in the sub-scanning direction of the input image extracted in Step S3703 and the target position x in the main scanning direction. The pixel data is defined as input pixel data $Pin_m$. In Step S3708, the CPU 303 performs the convolution calculation with the filter calculation portion 405. More specifically, the filter calculation portion 405 subjects the corresponding coefficient knm determined in Step S3704 and the input pixel data $Pin_m$ obtained in S3707 to a product-sum calculation, to thereby determine a value $Pout_n$ of the target pixel. The input pixel data $Pin_m$ is density of the target pixel before the filtering, and the value $Pout_n$ of the target pixel is output pixel data and is density of the target pixel after the filtering.

$$Pout_n = \sum_{m}^{all} k_{nm} \cdot Pin_m \quad \text{Expression (30)}$$

Expression (30) corresponds to FIG. 16A to FIG. 16D. The darkness (density) of the circles on the left side in FIG. 16A to FIG. 16D corresponds to the input pixel data $Pin_m$. D1 and D2 in FIG. 16A correspond to $k_{nm} \times Pin_m$. The darkness (density) of the circles on the right side in FIG. 16A to FIG. 16D corresponds to $Pout_n$.

In Step S3709, the CPU 303 adds 1 to the position x in the main scanning direction. In Step S3710, the CPU 303 determines whether or not one line has been completed, that is, whether or not the scanning has reached the last pixel in one line. When the CPU 303 determines that one line has not been completed, the CPU 303 returns to the processing in Step S3707. When the CPU 303 determines that one line has been completed, the CPU 303 terminates the filtering. In this embodiment, as described with reference to FIG. 15, the target line, one upper scanning line, and one lower scanning line are subjected to the filtering.

In this embodiment, distortion and uneven image density of an image caused by the deviation of an irradiation position due to a variation in position of the multibeam and the optical face tangle error of the mirror faces of the rotary polygon mirror 204 are corrected by subjecting a pixel position of an input image to the coordinate transformation based on a profile of positional deviation in the sub-scanning direction of the input image. Then, the filtering and sampling are performed, thereby enabling cancellation of positional deviation and local biased density such as banding while maintaining the density of each input image, with the result that a satisfactory image can be obtained.

<Beam Skipping Control>

In this embodiment, an example is described in which the mirror faces of the rotary polygon mirror 204 to be used for the image formation are selectively thinned, to thereby perform the face skipping control. Besides the face skipping control, as a method of changing the printing speed, there is given, for example, a method of thinning beams to be used for printing in a multibeam light source, and this method is called beam skipping control. In this case, all the mirror faces of the rotary polygon mirror 204 are used. For example, part (e.g., leading four beams) of eight beams are turned on, and the remaining beams are turned off. Also in the beam skipping control, the process speed is reduced in accordance with the beam skipping control. Also in the case of performing the beam skipping control of thinning beams, storage of a positional deviation amount, in which the positional deviation information of beams not used for scanning of a laser beam is thinned, into the register 402 or the calculation of the positional deviation amount Zmn, the filter calculation, and the like are similarly performed.

In this embodiment, an image position can be adjusted to a predetermined position for each scanning line even when the thinning control is used. As described above, according to this embodiment, an image defect, e.g., banding and color misregistration, can be reduced even when the thinning control is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-141778, filed Jul. 16, 2015, which is hereby incorporated by reference herein in its entirety.

What is claimed is:

1. An image forming apparatus, comprising:
   a photosensitive member rotating in a first direction;
   a light scanning device having:
   a light source including a plurality of light emission points; and
   a deflecting unit configured to deflect a light beam emitted from the light source and move spots of the light beam radiated to the photosensitive member in a second direction orthogonal to the first direction, to thereby form scanning lines, the light scanning device configured to, when the photosensitive member rotates at a slower speed than a predetermined speed, irradiate the photosensitive member with the light beam through use of part of scanning lines corresponding to the slower speed among a plurality of scanning lines formed on the photosensitive member when the photosensitive member rotates at the predetermined speed;

a storage unit in which information on positional deviation of the plurality of scanning lines in the first direction is stored; and a correction portion configured to, with a predetermined scanning line and a scanning line group included within a predetermined range in an advance direction and a return direction in the first direction from the predetermined scanning line being targeted, calculate a correction value for correcting positional deviation amounts of the predetermined scanning line and the scanning line group in the first direction based on the information stored in the storage unit, and correct positional deviation of the predetermined scanning line in the first direction based on the calculated correction value, wherein the correction portion is configured to, when the photosensitive member rotates at the slower speed, extract information corresponding to the part of the scanning lines from the information stored in the storage unit, to thereby calculate the correction value for correcting the positional deviation amount of the predetermined scanning line.

2. An image forming apparatus according to claim 1, further comprising:

a first register in which information corresponding to the plurality of scanning lines read from the storage unit is stored; and a second register in which information corresponding to the part of the scanning lines read from the storage unit is stored, wherein the correction portion is configured to read the information from the first register when the photosensitive member rotates at the predetermined speed, and read the information from the second register when the photosensitive member rotates at the slower speed.

3. An image forming apparatus according to claim 1, wherein the correction portion comprises:

a conversion portion configured to convert a position of a pixel of an input image by performing coordinate transformation based on the extracted information so that an interval between the scanning lines on the photosensitive member becomes a predetermined interval; and a filtering portion configured to determine a pixel value of a pixel of an output image by subjecting a pixel value of the pixel of the input image to a convolution calculation based on the position of the pixel of the input image after the coordinate transformation.

4. An image forming apparatus according to claim 3, wherein the conversion portion is configured to determine the position of the pixel of the input image after the coordinate transformation through use of an inverse function $ft^{-1}(n)$ of a function $ft(n)$ by the following expression:

$$fs'(n)=ft'(ft^{-1}(fs(n)))$$

where:
$fs(n)$ represents a function indicating a position of an n-th pixel in the first direction of the input image;
$ft(n)$ represents a function indicating a position of the n-th pixel in the first direction of the output image;
$fs'(n)$ represents a function indicating a position of the n-th pixel in the first direction of the input image after the coordinate transformation; and
$ft'(n)$ represents a function indicating a position of the n-th pixel in the first direction of the output image after the coordinate transformation.

5. An image forming apparatus according to claim 4, wherein the conversion portion is configured to determine, when the function $fs(n)$ satisfies $fs(n)=n$ and the function $ft'(n)$ satisfies $ft'(n)=n$, the position of the pixel of the input image after the coordinate transformation by the following expression:

$$fs'(n)=ft^{-1}(n).$$

6. An image forming apparatus according to claim 3, wherein the filtering portion is configured to perform the convolution calculation through use of one of linear interpolation and bicubic interpolation.

7. An image forming apparatus according to claim 3, wherein the pixel value is a density value, and
wherein the filtering portion is configured to store a density value per predetermined area before and after performing the convolution calculation.

8. An image forming apparatus according to claim 3, wherein the predetermined interval is determined in accordance with a resolution of image formation.

9. An image forming apparatus according to claim 1, wherein the deflection unit is a rotary polygon mirror having a predetermined number of faces, and
wherein the information to be stored in the storage unit contains information on a variation in angle for each of the faces with respect to a rotary shaft of the rotary polygon mirror.

10. An image forming apparatus according to claim 9, wherein, when the photosensitive member rotates at the slower speed, the part of the scanning lines is used among the plurality of scanning lines through use of part of the predetermined number of faces.

11. An image forming apparatus according to claim 1, wherein, when the photosensitive member rotates at the slower speed, the part of the scanning lines is used among the plurality of scanning lines through use of part of light beams among a plurality of light beams emitted from the plurality of light emission points.

* * * * *